United States Patent
Ikebata et al.

(10) Patent No.: US 8,913,266 B2
(45) Date of Patent: Dec. 16, 2014

(54) IMAGE FORMING APPARATUS AND CONTROL METHOD OF AN IMAGE FORMING APPARATUS HAVING AN ORDINARY READING MODE AND A QUIET READING MODE

(71) Applicant: KYOCERA Document Solutions Inc., Osaka (JP)

(72) Inventors: Yoshiaki Ikebata, Osaka (JP); Ryusuke Nakatani, Osaka (JP); Yumi Hirobe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/250,967

(22) Filed: Apr. 11, 2014

(65) Prior Publication Data

US 2014/0320876 A1    Oct. 30, 2014

(30) Foreign Application Priority Data

Apr. 25, 2013  (JP) ................................ 2013-092886

(51) Int. Cl.
  *G06F 3/12*  (2006.01)
  *H04N 1/23*  (2006.01)
(52) U.S. Cl.
  CPC ................................. *H04N 1/2369* (2013.01)
  USPC ........... 358/1.13; 358/1.5; 358/463; 358/474; 358/496; 358/497
(58) Field of Classification Search
  CPC ..................................................... H04N 1/2369

USPC ......... 358/1.13, 1.5, 463, 474, 505, 486, 496, 358/497
See application file for complete search history.

(56) References Cited

U.S. PATENT DOCUMENTS

| | | | |
|---|---|---|---|
| 5,953,497 A * | 9/1999 | Kokubo et al. ................. | 358/1.9 |
| 6,188,419 B1 * | 2/2001 | Katamoto et al. ............ | 347/129 |
| 7,826,105 B2 * | 11/2010 | Yamaguchi .................... | 358/474 |
| 2002/0021345 A1 * | 2/2002 | Fujimoto et al. .............. | 347/116 |
| 2007/0064256 A1 * | 3/2007 | Tanaka ......................... | 358/1.13 |
| 2009/0086286 A1 * | 4/2009 | Tojo ............................. | 358/488 |
| 2013/0163779 A1 * | 6/2013 | Yamaguchi et al. ......... | 381/73.1 |

FOREIGN PATENT DOCUMENTS

JP    2004-167798 A    6/2004

\* cited by examiner

*Primary Examiner* — Benny Q Tieu
*Assistant Examiner* — Quyen V Ngo
(74) *Attorney, Agent, or Firm* — Stein IP, LLC

(57) ABSTRACT

An image forming apparatus has a printing section and a document reading section. The printing section prints on paper while transporting it. The document reading section includes a document transport portion which automatically transports, sheet by sheet, a document placed thereon. The document reading section generates image data by reading the document. The document reading section is operable in an ordinary reading mode in which it reads the document at a previously determined ordinary speed and in a quiet reading mode in which it reads the document at a quiet speed lower than the ordinary speed. The document reading section reads the document in the quiet reading mode when the printing section is not printing and in the ordinary reading mode when the printing section is printing.

18 Claims, 11 Drawing Sheets

IMAGE FORMING APPARATUS AND CONTROL METHOD OF AN IMAGE FORMING APPARATUS HAVING AN ORDINARY READING MODE AND A QUIET READING MODE

CROSS-REFERENCE TO RELATED APPLICATIONS

This application is based upon and claims the benefit of priority from the corresponding Japanese Patent Application No. 2013-092886, filed on Apr. 25, 2013, in the Japanese Patent Office. All disclosures of the document(s) named above are incorporated herein by reference.

BACKGROUND OF THE INVENTION

The present disclosure relates to an image forming apparatus that includes a printing section and a section which reads a document.

In an image forming apparatus such as a copier or a multifunction peripheral, execution of jobs is accompanied by generation of noise. Too loud noise from an image forming apparatus is disturbing, and is perceived unpleasant by the user. On an occasion of introducing a new image forming apparatus, how loud noise it gives off during execution of jobs may be taken into consideration. Therefore, the noise given off from an image forming apparatus during execution of jobs should preferably be as low as possible.

With reduction of operating noise in mind, a known image forming apparatus operates as follows: specifically, it reads a document, and transports recording paper from a recording paper containing portion to an image recording portion to record the read image; it has a quiet mode in which it performs the recording more quietly than usual so that it performs the recording, ordinarily, by starting transport of the recording paper before completion of the reading and, when quiet mode is selected, by starting transport of the recording paper after completion of the reading. Operating noise is reduced in response to operation of a switching means for reduction of operating noise (a switch for quiet mode).

An image forming apparatus can be provided with a document reading section (scanner) to read a document to obtain image data. To save the trouble of setting the document sheet by sheet, the document reading section can be furnished with a function of automatically transporting one sheet after another out of the stack of the document placed. The document reading section generates image data by reading page after page of the document that are transported automatically and sequentially.

When reading the document, the document reading section gives off noise resulting from transport of the document. The noise given off from the document reading section includes noise resulting from feeding of the document, such as thrusting noise and handling noise; noise resulting from the transported document colliding with and rubbing against transport guides; driving noise of a motor for transporting the document; and noise resulting from operation of rotary members such as rollers and mechanical components such as gears that are rotated by the motor to transport the document.

Thus, as the document is read, noise is generated. So that an image forming apparatus, while executing a job, does not give off noise so disturbing as to be perceived unpleasant by the user, it is preferable to reduce the noise generated in the document reading section. The faster the document is transported, the louder the noise resulting from its reading tends to be. Thus, the more slowly the document is read (the lower the transport speed), the easier it is to reduce the noise generated in the document reading section.

However, reducing the transport speed of the document reduces the number of sheets of the document that are read per unit time, leading to lower productivity. Therefore, giving priority to the handling performance (reading speed) of the document reading section tends to result in noise so disturbing as to be perceived unpleasant by the user; on the other hand, giving priority to quietness tends to result in low productivity in the document reading section.

The known image forming apparatus mentioned above has a quiet mode in which it operates with reduced operating noise. However, in this image forming apparatus, even in quiet mode, the speed at which the document is transported and read is the same as in ordinary mode. That is, while document reading alone is taking place, no care to suppress noise so disturbing as to be perceived unpleasant by the user is taken by reducing the document transport speed. Thus, this known design does not provide a solution to the problem of document reading being accompanied by noise so disturbing as to be perceived unpleasant by the user. Nor does it provide a solution to the difficulty achieving, in the document reading section, so suppressed operating noise as not to be perceived disturbing combined with satisfactory productivity (high-speed reading performance).

SUMMARY OF THE INVENTION

Against the background discussed above, the present disclosure aims, in an image forming apparatus, to achieve high-speed document reading while saving the user from disturbing and unpleasant noise and thereby achieving enhanced overall quietness.

While no printing operation (printing job) such as paper transport and toner image formation is being performed, transporting a document at a high speed generates outstanding document transport noise, which tends to be so disturbing as to be perceived unpleasant by the user. A document reading section is provided in an upper part of the image forming apparatus, and is located near the user's ears. Thus, noise resulting from document transport without printing tends to be easily caught by the ear. On the other hand, when printing is performed, noise is generated through paper feeding, paper transport, and image formation. The noise given off from the printing section is louder than the noise given off from the document reading section, and thus, during printing, even when the document is transported at a high speed, the noise given off from the printing section masks the noise given off from the document reading section (the noise resulting from reading of the document), making the latter less disturbing.

Thus, according to one aspect of the present disclosure, an image forming apparatus includes a printing section which prints on paper while transporting it and a document reading section, the latter including a document transport portion which automatically transports, sheet by sheet, a document placed thereon. Here, the document reading section is operable in an ordinary reading mode in which it reads the document at a previously determined ordinary speed and in a quiet reading mode in which it reads the document at a quiet speed lower than the ordinary speed In a copying job in which the printing section prints based on image data obtained by reading the document transported by the document transport portion, the document reading section generates the image data by reading the document in the quiet reading mode until the printing section starts to print based on the image data obtained by document reading, and generates the image data by reading the document in the ordinary reading mode after the printing section starts to print based on the image data obtained by document reading.

Further features and advantages of the present disclosure will become apparent from the description of embodiments given below.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Hereinafter, embodiments of the present disclosure will be described with reference to FIGS. 1 to 14. The following description deals with, as an example, a multifunction peripheral 100 (corresponding to an image forming apparatus) including a document reading section 1 and a printing section 2. It should however be understood that any features in terms of configuration, arrangement, etc. discussed in connection with the embodiments presented herein are not meant to limit the scope of the present disclosure but are described by way of examples.

(Outline of an Image Forming Apparatus)

Figure 1:
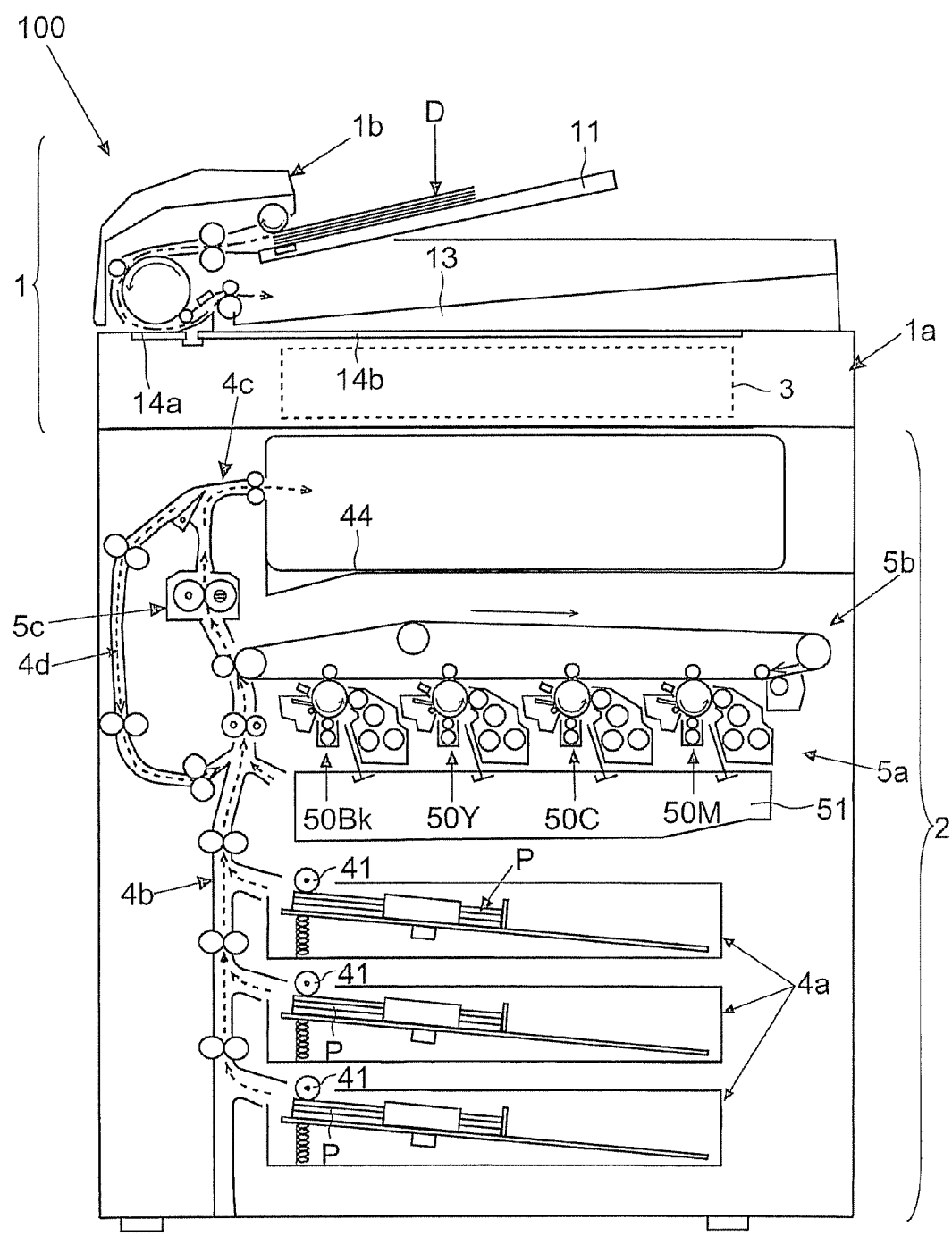
FIG. 1 is a diagram showing a multifunction peripheral according to one embodiment of the present disclosure.

First, with reference to FIG. 1, an outline of the multifunction peripheral 100 according to one embodiment will be described. FIG. 1 is a diagram showing the multifunction peripheral 100.

As shown in FIG. 1, in an upper front part of the multifunction peripheral 100, an operation panel 3 (corresponding to an operation section) for accepting various settings on the multifunction peripheral 100 is provided (details will be given later). The multifunction peripheral 100 according to this embodiment is provided with, in an upper part thereof, a document reading section 1 which reads a document D to generate image data. The document reading section 1 includes a image reading portion 1a, and also includes a document transport portion 1b for transporting the document D sheet by sheet automatically. The multifunction peripheral 100 includes, as a printing section 2 for printing on paper P while transporting it, a paper feed portion 4a, a transport portion 4b, an image forming portion 5a, an intermediary transfer portion 5b, a fusing portion 5c, a discharge transport portion 4c, and a two-sided transport portion 4d.

The paper feed portion 4a comprises a plurality of paper feed portions, of which each can contain paper P on which to print. Each paper feed portion 4a includes a paper feed roller 41, which is driven to rotate. During printing, any relevant paper feed roller 41 rotates to feed paper P sheet by sheet into the transport portion 4b. The transport portion 4b transports the paper P. The image forming portion 5a includes a plurality of image forming units 50 (50Bk for black, 50Y for yellow, 50C for cyan, and 50M for magenta) and an exposing device 51. Each image forming unit 50 includes a photosensitive drum, a charging device, a developing device, a cleaning device, etc. The exposing device 51 outputs laser light that is turned on an off according to image data, and thereby scans each photosensitive drum for exposure. The image forming units 50 and the exposing device 51 together form toner images on the circumferential surface of each photosensitive drum.

The intermediary transfer portion 5b receives the toner images primarily transferred from the respective image forming units 50, and secondarily transfers them to the paper P. The fusing portion 5c fuses the toner images to the paper P. The discharge transport portion 4c discharges the paper P to a discharge tray 44. For two-sided printing, a discharge roller pair 46 switches the paper P back so that the paper P printed on one side is fed to the two-sided transport portion 4d.

(Document Reading Section 1)

Figure 2:
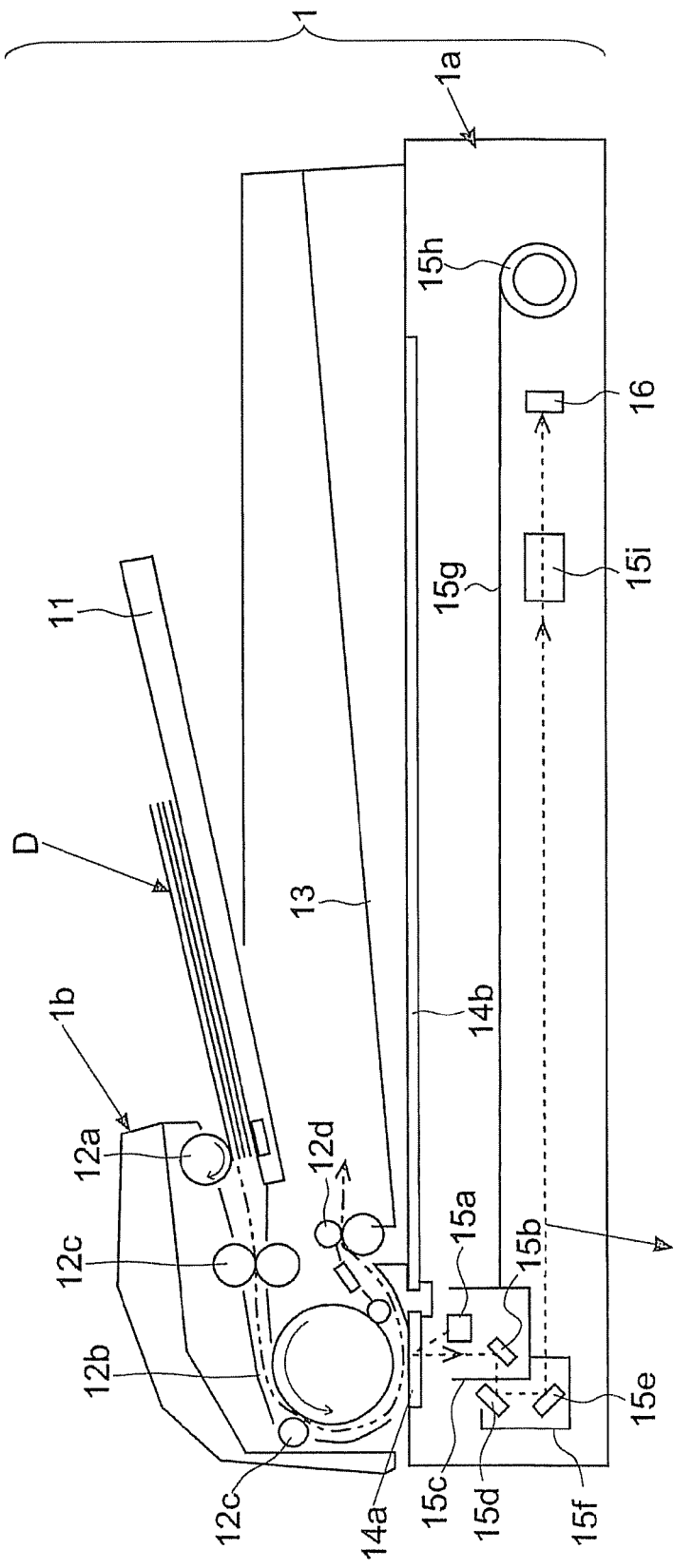
FIG. 2 is a diagram showing a document reading section according to one embodiment of the present disclosure.

Next, with reference to FIG. 2, the document reading section 1 according to an embodiment will be described. FIG. 2 is a diagram showing the document reading section 1.

In this embodiment, the multifunction peripheral 100 includes a document reading section 1. The document reading section 1 includes a document transport portion 1b and a image reading portion 1a.

The document transport portion 1b is provided over the image reading portion 1a. The document transport portion 1b includes, from the upstream side with respect to the document transport direction, a document tray 11, a document feed roller 12a, a document transport passage 12b, a document transport roller pair 12c, a document discharge roller pair 12d, a document discharge tray 13, etc. The document transport portion 1b transports a document D placed on the document tray 11, sheet by sheet, automatically and sequentially, toward a feed-reading contact glass 14a (the reading position). The document transport portion 1b is fitted so as to be swingable, about a pivot located at the back as seen in FIGS. 1 and 2, between a closed and an open position in the up/down direction with respect to the image reading portion 1a, and thus functions as a plate for pressing contact glasses from above.

Next, the image reading portion 1a according to this embodiment will be described. The image reading portion 1a has, on its top face, a feed-reading contact glass 14a for reading a document D while it is being transported and a stationary-reading contact glass 14b for reading a document D placed still.

Moreover, as shown in FIG. 2, the image reading portion 1a includes, inside a housing, optical components such as a first movable frame 15c (a lamp 15a and a first mirror 15b), a second movable frame 15f (a second mirror 15d and a third mirror 15e), a wire 15g, a rewind drum 15h, a lens 15i, and an image sensor 16. The light from the lamp 15a strikes the document D on the contact glasses to eventually enter the image sensor 16. The image sensor 16 reads the document D line by line to generate image data.

The first movable frame 15c and the second movable frame 15f are fitted with a plurality of wires 15g (of which only one is shown in FIG. 2 for convenience sake). A rewind motor 15m (see FIG. 5) permits the rewind drum 15h to rotate in a forward and a reverse direction, enabling the first movable frame 15c and the second movable frame 15f to move freely in the horizontal direction. When a document D transported by the document transport portion 1b is read, the rewind motor 15m so operates that the first movable frame 15c and the second movable frame 15f are kept in fixed position under the feed-reading contact glass 14a (the reading position). On the other hand, when a document D placed on the stationary-reading contact glass 14b is read, the rewind motor 15m so operates as to move the first movable frame 15c and the second movable frame 15f from a home position horizontally rightward as seen in FIG. 2.

(Operation Panel 3)

Figure 3:
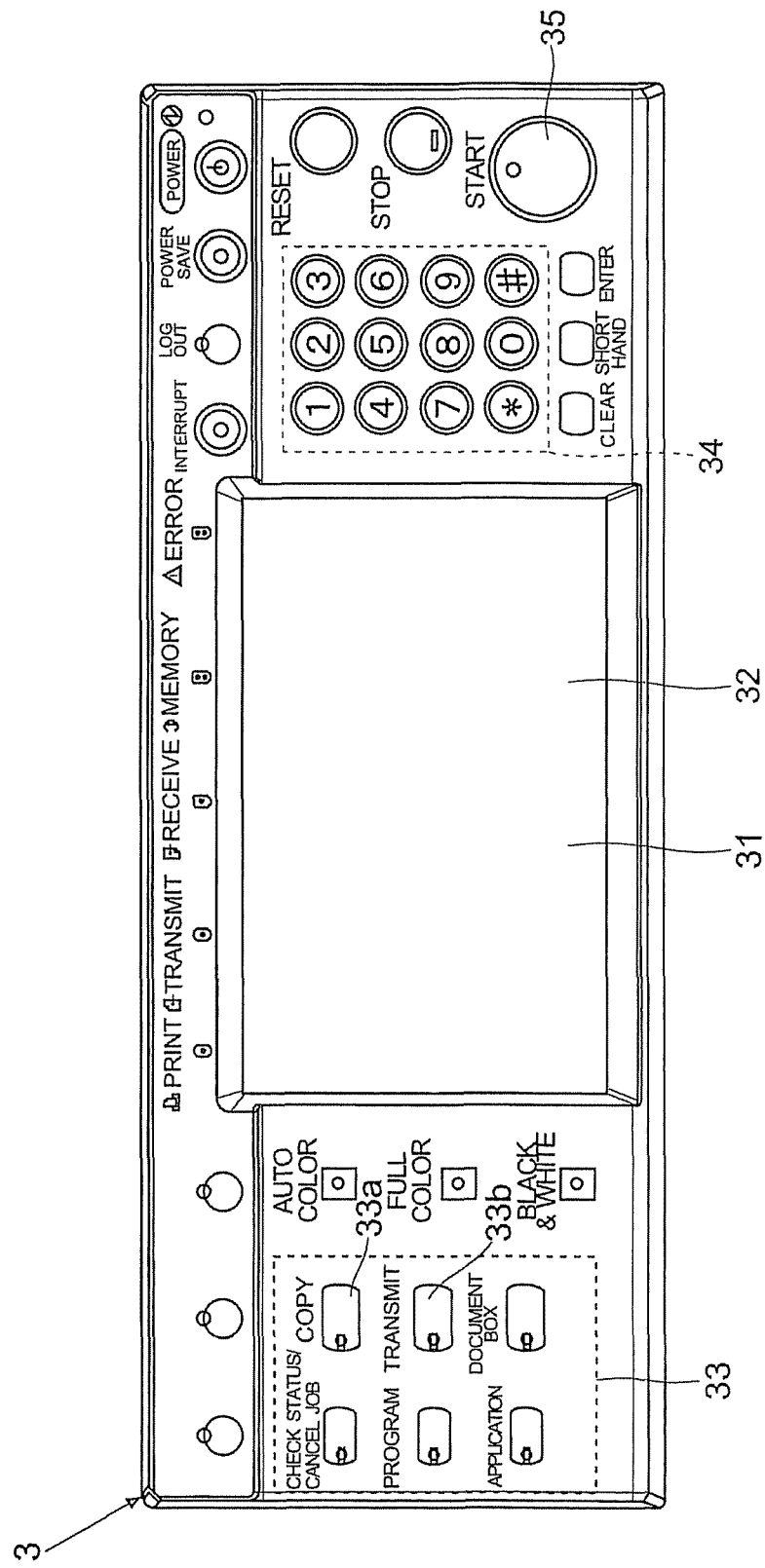
FIG. 3 is a diagram showing an operation panel according to one embodiment of the present disclosure.

Next, with reference to FIGS. 1 and 3, an example of the operation panel 3 according to one embodiment will be described. FIG. 3 is a diagram showing the operation panel 3.

The multifunction peripheral 100 has (can perform) a plurality of functions, including a copying function (a copying job), a transmission function (transmission job) which allows data obtained by reading a document D to be stored somewhere, and a box function which allows use of image data stored in a storage device 61 (see FIG. 4) of the multifunction peripheral 100. In other words, the multifunction peripheral 100 can execute many kinds of jobs.

For selection of, and setting for, specific functions, the operation panel 3 is provided. The operation panel 3 is provided in an upper front part of the multifunction peripheral 100 (see FIG. 1). The operation panel 3 is provided with, to allow selection of a function to be used, a set of function selection keys 33 (including a COPY key 33a and a TRANSMIT key 33b), a numerical keypad 34, a START key 35, etc.

The operation panel 3 also includes a display portion 31. The display portion 31 displays selection screens showing items selectable when using a function (when executing a job), setting screens showing alternatives settable for a selected item, and keys for entering desired values. A touch panel portion 32 is provided for (on the top surface of) the display portion 31. The touch panel portion 32 detects a position (coordinates) touched within the area of the display portion 31. Based on the output from the touch panel portion 32, the image, key, or the like being shown at the touched position is recognized, and thereby an operation by the user is accepted.

(Hardware Configuration of the Multifunction Peripheral 100, Etc.)

Figure 4:
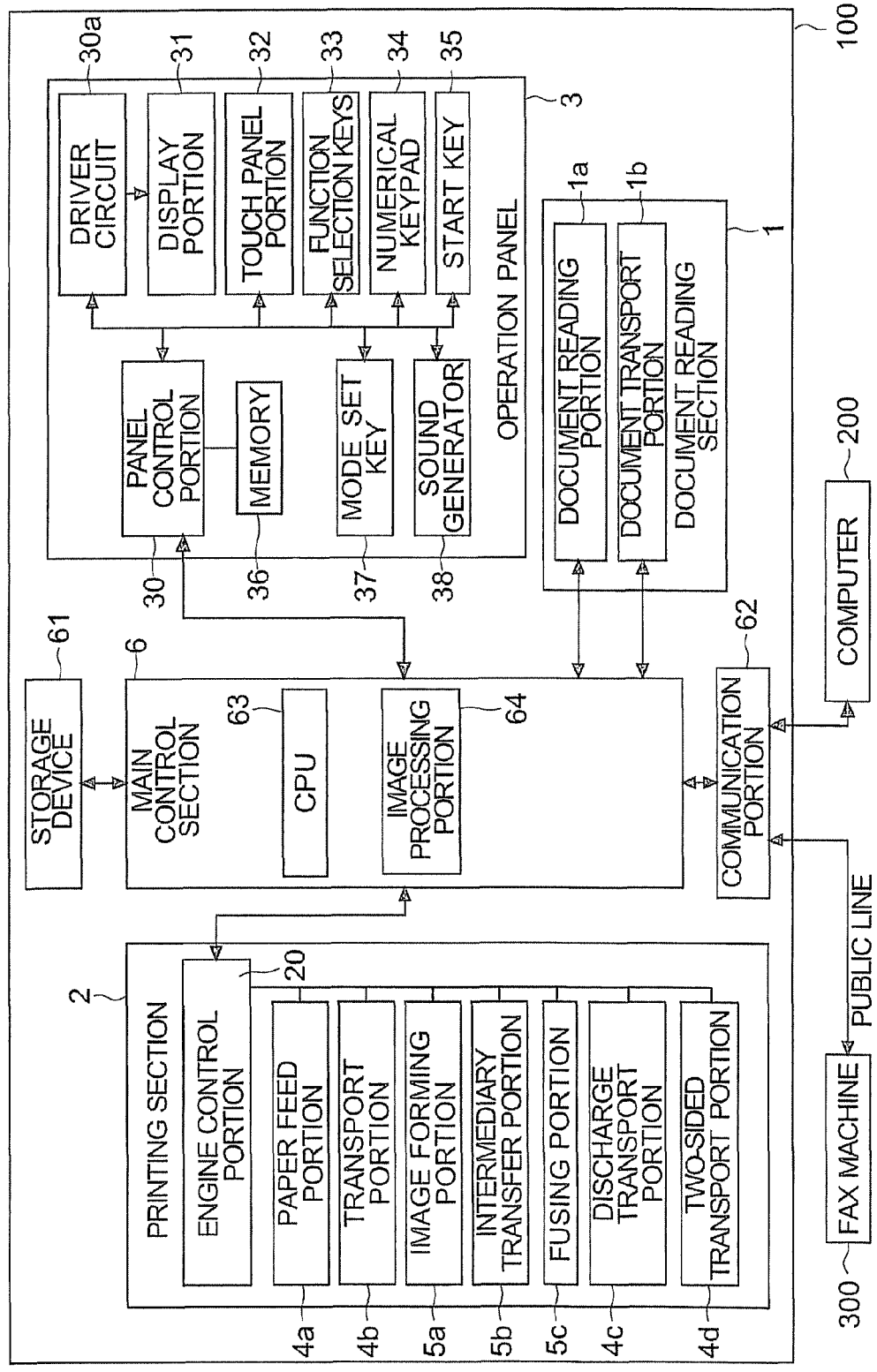
FIG. 4 is a diagram showing a hardware configuration of a multifunction peripheral according to one embodiment of the present disclosure.

Next, with reference to FIG. 4, an example of the hardware configuration of a multifunction peripheral 100 according to one embodiment will be described. FIG. 4 is a diagram showing the hardware configuration of the multifunction peripheral 100.

The multifunction peripheral 100 has, first of all, a main control section 6. The main control section 6 is connected to the operation panel 3, the document reading section 1, the printing section 2, the storage device 61, a communication portion 62, etc., and controls the entire multifunction peripheral 100. In the main control section 6, a CPU 63 performs arithmetic and other operations for control. An image processing portion 64 performs image processing on image data obtained by scanning or received via the communication portion 62 to generate image data for printing or transmission.

The storage device 61 comprises a combination of non-volatile storage devices such as a ROM and a HDD and volatile storage devices such as a RAM. The storage device 61 stores data for control, programs for control, image data, and data related to settings, etc. The communication portion 62 can, according to instructions from the main control section 6, transmit image data to a computer 200, a FAX (facsimile) machine 300, or the like over a network, a communication line, a cable, or the like. The main control section 6 can also make the communication portion 62 receive image data from the computer 200, the FAX machine 300, or the like, and make the printing section 2 print based on the received image data.

The main control section 6 is connected to the document reading section 1 (the document transport portion 1b and the image reading portion 1a), and gives instructions to and controls them to operate. The main control section 6 is also connected to an engine control portion 20 for controlling the printing section 2. The engine control portion 20 controls, according to instructions from the main control section 6, the operation of the paper feed portion 4a, the transport portion 4b, the image forming portion 5a, the intermediary transfer portion 5b, the fusing portion 5c, the discharge transport portion 4c, the two-sided transport portion 4d, etc. to make the printing section 2 print. The main control section 6 further recognizes inputs made on the operation panel 3 and controls the multifunction peripheral 100 to execute jobs according to the user's settings.

The operation panel 3 includes a panel control portion 30, a memory 36, a driver circuit 30a, a display portion 31, a touch panel portion 32, etc. The panel control portion 30 controls display on the display portion 31. The panel control portion 30 also receives the output from the touch panel portion 32, recognizes the display position of a key or an image touched, and thereby recognizes the operation made. The panel control portion 30 also recognizes a touched (pressed) hardware key (among the set of function selection keys 33, the numerical keypad 34, and the START key 35), and conveys the result to the main control section 6.

(Ordinary Reading Mode and Quiet Reading Mode)

Figure 5:
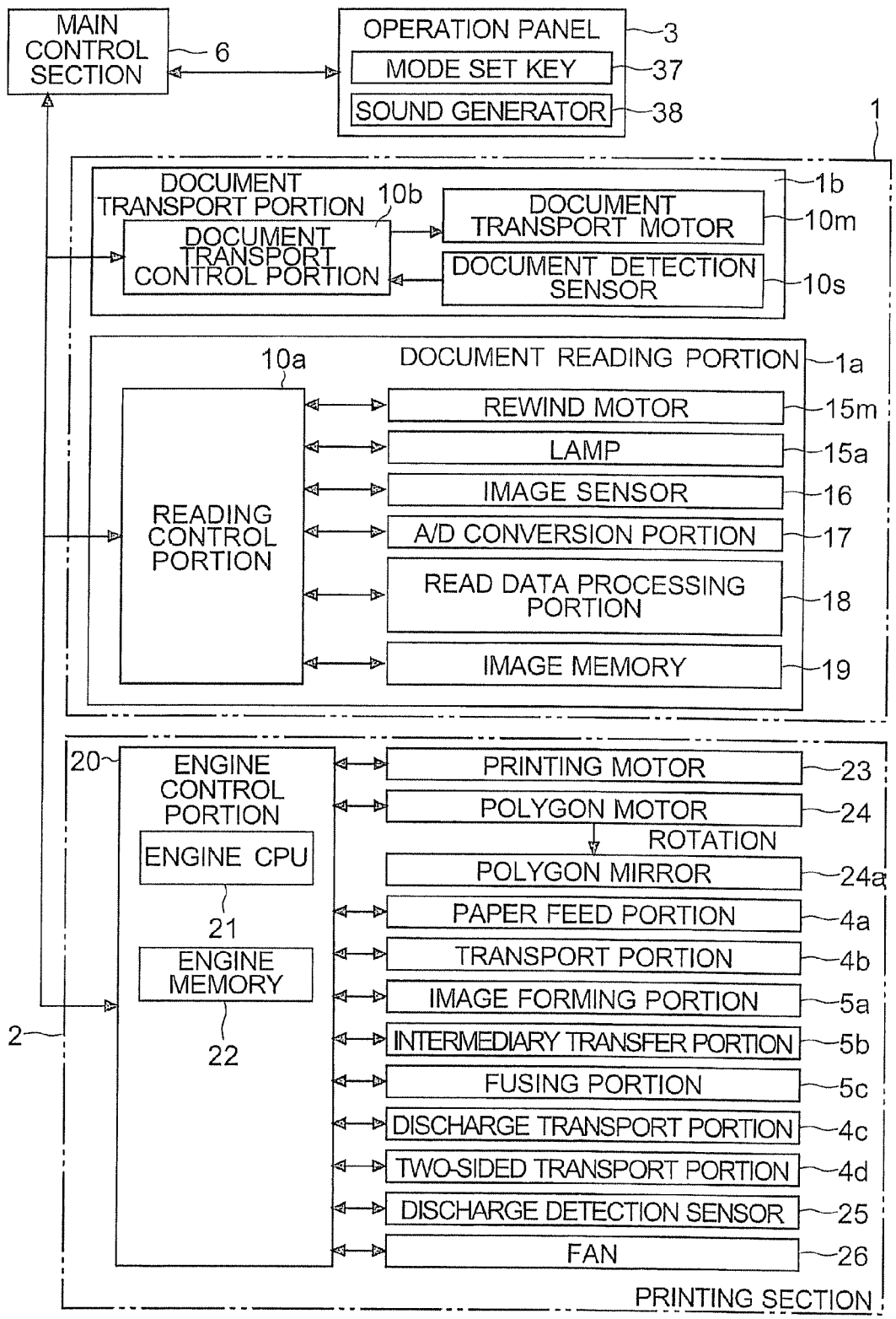
FIG. 5 is a diagram illustrating job execution speed according to one embodiment of the present disclosure.

Next, with reference to FIG. 5, a description will be given of modes related to the speed at which a document D is read in a document reading section 1 according to one embodiment. FIG. 5 is a diagram illustrating job execution speed.

The document reading section 1 can operate in an ordinary reading mode in which it reads a document D at a previously determined ordinary speed. In other words, the ordinary reading mode is a mode in which a document D is read at a previously determined ordinary job execution speed as designed (for example, the number of document sheets read per minute as designed). The document reading section 1 can also operate in a quiet reading mode in which it reads a document D at a quiet speed lower than the ordinary speed (in ordinary reading mode) to reduce operating noise.

In quiet reading mode, the document D is read at a reduced speed. This helps reduce the noise resulting from the document D being thrust, the noise resulting from the document D colliding with and rubbing against transport guides, the noise resulting from rotation of a document transport motor 10m, the noise generated by rotary members, such as the document feed roller 12a, and mechanical components, such as gears, that rotate during document transport, etc. In other words, in quiet reading mode, the document reading section 1 makes less noise than in ordinary reading mode.

The reading speed in quiet reading mode can be determined arbitrarily in a range lower than the reading speed in ordinary reading mode. Specifically, the speed at which the document D is read in quiet reading mode can be set arbitrarily to be, for example, one-half, one-third, three-fourths, two-thirds, or three-fifths of the reading speed in ordinary reading mode. The following description assumes that the reading speed in quiet reading mode equals one-half of the reading speed in ordinary reading mode.

In the multifunction peripheral 100 according to this embodiment, whether the printing section 2 is printing or not decides the reading mode of the document reading section 1 (details will be given later). Incidentally, a configuration is possible where the mode in which to read a document D can be set on the operation panel 3. In that case, the operation panel 3 is provided with a mode set key 37 for selecting a mode in which to read a document D. The mode set key 37 may be provided as a hardware key on the operation panel 3, or may be shown as a software key on the display portion 31. Thus, the mode set key 37 on the operation panel 3 accepts a setting as to whether to read a document D in quiet reading mode or in ordinary reading mode.

Next, a description will be given of speed control in each reading mode. The document transport portion 1b is provided with a document transport control portion 10b. The document transport control portion 10b controls document transport according to instructions from the main control section 6. The document transport control portion 10b is a circuit (circuit board) comprising a CPU, a ROM, a ROM, ICs, devices, etc.

In a copying job (a job for performing printing based on image data obtained through image reading by the document reading section 1), and in a transmission job (a job for transmitting image data obtained through image reading by the document reading section 1 to the computer 200, a FAX machine 300, a storage device 61, or the like), the document transport control portion 10b transports, sheet by sheet, the document D placed on the document tray 11. The document reading section 1 is provided with a document detection sensor 10s for detecting whether the document is present or absent on the document tray 11.

The document transport control portion 10b controls the operation of the document transport motor 10m for rotating a rotary member that transports the document D placed on the document tray 11. Under the condition that, based on the output from the document detection sensor 10s, it is recognized that a document D is placed on the document tray 11, the document transport control portion 10b sets the rotation speed of the document transport motor 10m lower (about one-half) during document reading in quiet reading mode than during job execution in ordinary reading mode. Thus, in quiet reading mode, the document transport control portion 10b controls such that the document D is transported at about one-half of the speed in ordinary reading mode.

The image reading portion 1a is also provided with a reading control portion 10a. The reading control portion 10a controls reading of a document D according to instructions from the main control section 6. The reading control portion 10a is a circuit (circuit board) comprising a CPU, a ROM, a RAM, ICs, devices, etc. The reading control portion 10a controls the rotation speed and rotation direction of any relevant rewind motor 15m. The reading control portion 10a also controls the on/off state of the lamp 15a (to keep it on while reading is taking place and off while reading is not taking place). The reading control portion 10a also controls the operation of the image sensor 16. The reading control portion 10a further makes an A/D conversion portion 17 generate image data based on the analog output from the image sensor 16. The reading control portion 10a also makes a read data processing portion 18 perform image processing for various kinds of correction and adjustment on the image data generated by the A/D conversion portion 17. The reading control portion 10a further controls such that the image data processed by the read data processing portion 18 is accumulated in an image memory 19. The reading control portion 10a eventually operates such that the image data is transmitted to the main control section 6 or the storage device 61.

Under the condition that, based on the output from the document detection sensor 10s, no document D is placed on the document tray 11, during document reading, the document transport control portion 10b makes the rewind motor 15m operate such that a document D placed on the stationary-reading contact glass 14b is read. The reading control portion 10a sets the rotation speed of the rewind motor 15m lower (about one-half) during job execution involving reading of the document D placed on the stationary-reading contact glass 14b in quiet reading mode than during job execution in ordinary reading mode. Thus, in quiet reading mode, the reading control portion 10a controls such that the document D is read at about one-half of the speed in ordinary reading mode.

During reading of a document D in quiet reading mode, the reading control portion 10a may make the image sensor 16, the A/D conversion portion 17, the read data processing portion 18, the image memory 19, etc. operate at a lower speed (with a slower clock rate) than in ordinary reading mode (for example, at about one-half of their operating frequency). Instead, the reading control portion 10a may make the image sensor 16, the A/D conversion portion 17, the read data processing portion 18, the image memory 19, etc. operate at the same speeds in ordinary reading mode and in quiet reading mode. In this case, the number of lines in the document transport direction (the sub scanning direction) is greater than that defined by the previously determined reading resolution, and accordingly the reading control portion 10a makes the read data processing portion 18 skip unnecessary lines.

As described above, the main control section 6 makes the document transport control portion 10b and the reading control portion 10a control the operation of the document reading section 1 (the document transport portion 1b and the image reading portion 1a) such that a document is read at suitable speeds in quiet reading mode and in ordinary reading mode respectively.

(Ordinary Printing Mode and Quiet Printing Mode)

Next, with reference to FIG. 5, a description will be given of modes related to the speed at which a printing section 2 prints according to one embodiment.

In this embodiment, the printing section 2 can operate in an ordinary printing mode in which it prints at a previously determined ordinary speed. The ordinary printing mode is a mode in which printing is performed at a previously determined ordinary job execution speed as designed (for example, the number of sheets printed per minute as designed). The printing section 2 can also operate in a quiet printing mode in which it prints at a lower speed than in ordinary printing mode.

In quiet printing mode, printing is performed at a reduced speed. This helps reduce the noise resulting from paper P being thrust (paper feed noise), the noise resulting from the paper P colliding with and rubbing against transport guides, the noise resulting from rotation of a printing motor 23, the noise generated by rotary members, such as the transport roller pairs 42a, 42b, and 42c, and mechanical components, such as gears, that rotate during paper transport and toner image formation, etc. In other words, in quiet printing mode, the printing section 2 makes less noise than in ordinary printing mode.

The printing speed in quiet printing mode can be determined arbitrarily in a range lower than the printing speed in ordinary printing mode. Specifically, the printing speed in quiet printing mode can be set arbitrarily to be, for example, one-half, one-third, three-fourths, two-thirds, or three-fifths of the printing speed in ordinary printing mode. The following description assumes that the printing speed in quiet printing mode equals one-half of the printing speed in ordinary printing mode.

Whether to print in quiet printing mode or in ordinary printing mode can be set on the operation panel 3. To that end, the mode set key 37 on the operation panel 3 accepts a setting as to whether to print in quiet printing mode or in ordinary printing mode.

Next, a description will be given of speed control in each printing mode. The printing section 2 is provided with an engine control portion 20. The engine control portion 20 controls the printing speed (the number of sheets printed per unit period) according to instructions from the main control section 6. The engine control portion 20 is a circuit (circuit board) comprising an engine CPU 21, an engine memory 22, ICs, devices, etc.

The engine control portion 20 controls the on/off state and rotation speed of a printing motor 23 provided within the printing section 2. The printing motor 23 comprises one motor or a plurality of motors. The printing motor 23 rotates rotary members that rotate during printing, such as rollers for paper transport (rotary members in the transport portion 4b and paper feed portion 4a) and rotary members involved in toner image formation, transfer, fusion, etc. (rotary members in the image forming portion 5a, the intermediary transfer portion 5b, and the fusing portion 5c). The engine control portion 20 also controls the on/off state and rotation speed of a polygon motor 24 provided within the exposing device 51 for scanning and exposure of the photosensitive drum.

In a copying job, in a printing job for performing printing based on data transmitted from a computer 200, and in a box printing job for performing printing based on image data accumulated in the storage device 61, the engine control portion 20 makes the printing section 2 print.

During printing in quiet printing mode, the engine control portion 20 sets the rotation speed of the printing motor 23 lower (about one-half) than during printing in ordinary printing mode. Thus, in quiet printing mode, the engine control portion 20 sets the execution speed of a printing job one-half of that in ordinary printing mode.

During scanning and exposure of the photosensitive drum in quiet printing mode, in accordance with the rotation speed of the photosensitive drum set lower than in ordinary printing mode, the engine control portion 20 may set the rotation speed of the polygon motor 24 slower than in ordinary printing mode. For example, the frequency of the driving signal fed to the polygon motor 24 can be reduced to about one-half. Instead, the engine control portion 20 may so control, while maintaining the same rotation speed of the polygon motor 24 in quiet printing mode, as to scan and expose the photosensitive drum at a rate of one line every several lines in accordance with the rate of speed reduction. For example, exposure based on image data can be performed at a rate of one line out of two lines.

As described above, the engine control portion 20 controls the operation of the printing section 2 such that printing is performed at suitable speeds in quiet printing mode and in ordinary printing mode respectively.

(Switching the Reading Speed According to the State of the Printing Section 2)

Figure 6:
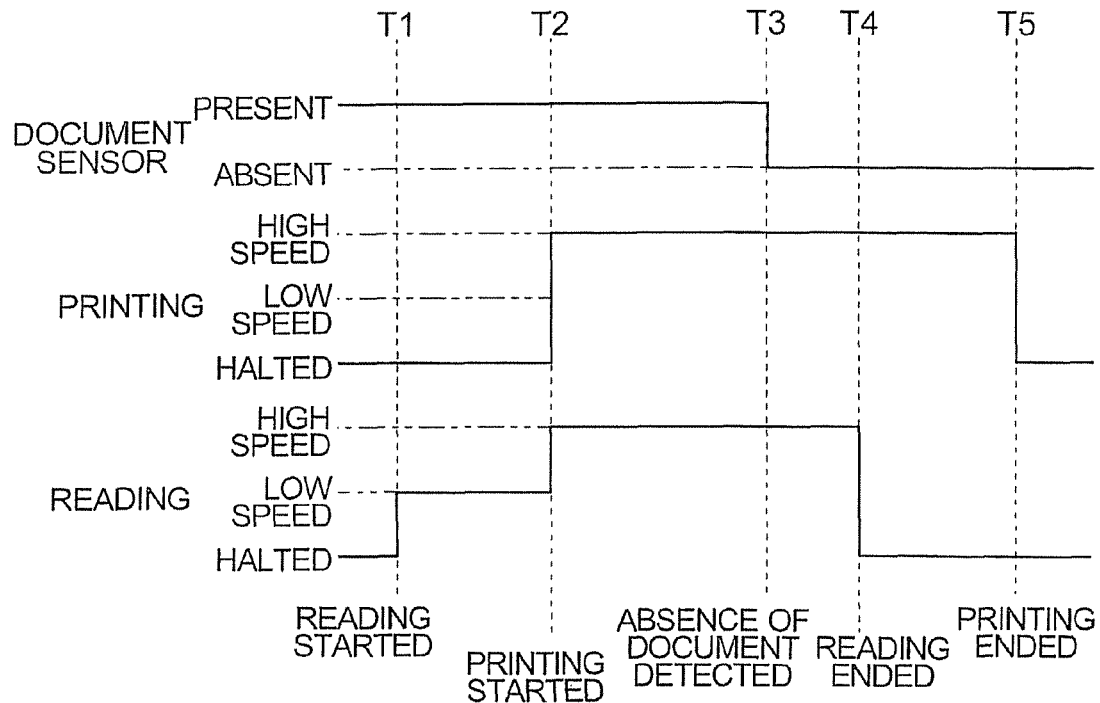
FIG. 6 is a timing chart illustrating reading speed switching in accordance with the state of a printing section according to one embodiment of the present disclosure.
Figure 7:
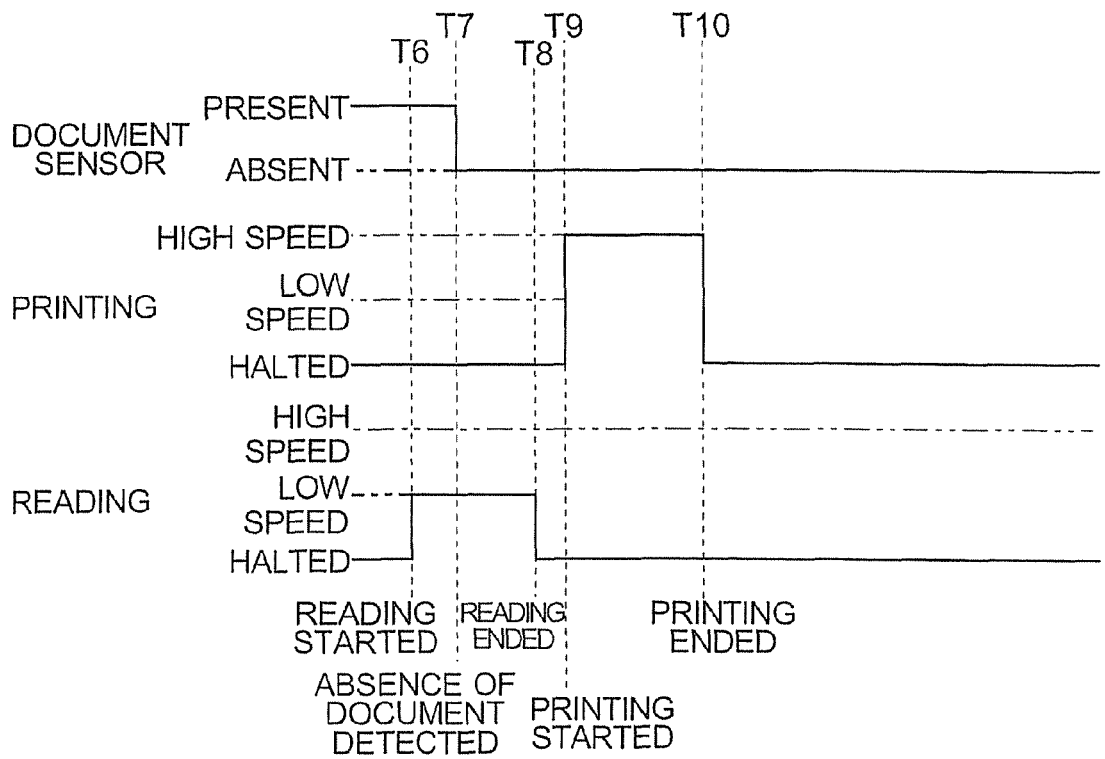
FIG. 7 is a timing chart showing operation performed with a document containing few sheets in an image forming apparatus according to one embodiment of the present disclosure.

Next, with reference to FIGS. 6 and 7, a description will be given of how a document D is read in accordance with the state of the printing section 2 in a multifunction peripheral 100 according to one embodiment. FIG. 6 is a timing chart illustrating how the reading speed is switched according to the state of the printing section 2. FIG. 7 is a timing chart showing operation performed when handling a document D containing few sheets.

When the printing section 2 is printing, the noise generated as the document reading section 1 reads the document D is masked by the noise of the printing operation, and thus is perceived less disturbing by the user. Accordingly, in the multifunction peripheral 100 according to this embodiment, during execution of a job involving document reading and printing performed concurrently, like a copying job for printing based on the image data of a read document D, while the printing section 2 is not printing, the main control section 6 makes the document transport control portion 10b and the reading control portion 10a control the document reading section 1 such that the document D is read in quiet reading mode. On the other hand, when the printing section 2 is printing, the main control section 6 makes the document transport control portion 10b and the reading control portion 10a control the document reading section 1 such that the document D is read in ordinary reading mode.

A more specific description will follow with reference to the timing charts in FIGS. 6 and 7. In FIGS. 6 and 7, the plot at top represents the output of the document detection sensor 10s. A high state is a state where the document detection sensor 10s is detecting presence of a document D (a state where there is a document D on the document tray 11). A low state is a state where the document detection sensor 10s is not detecting presence of a document D (a state where there is no document D on the document tray 11).

In FIGS. 6 and 7, the plot at middle represents the printing speed in the printing section 2. The closer to a high state labeled "high speed," the higher the printing speed in a given state. In FIGS. 6 and 7, a low state is a state where printing is being suspended (a state where no paper feeding, paper transport, toner image formation, or the like is being performed). The high state is a state where printing is being performed in ordinary printing mode (at ordinary speed). Although the multifunction peripheral 100 according to this embodiment can operate in quiet printing mode, the explanation of FIGS. 6 and 7 deals with printing in ordinary printing mode.

In FIGS. 6 and 7, the plot at bottom represents the reading speed in the document reading section 1. The closer to a high state labeled "high speed," the higher the reading speed in a given state. In FIGS. 6 and 7, the high state is a state where a document D is being read in ordinary reading mode (at ordinary speed), and a state labeled "low speed" between the high and a low state is a state where a document D is being read in quiet reading mode (at quiet speed); moreover, the low state is a state where document reading is being suspended (a state where no document transport, light emission by a light source, image reading by the image sensor 16, or the like is being performed).

In FIG. 6, time point T1 is a time point at which the START key 35 is touched to start a copying job (a time point at which the first sheet of the document D starts to be fed). Time point T2 is a time point at which printing starts to be performed, as marked by the start of paper transport, toner image formation, rotation of rotary members in the printing section 2, and the like. In other words, it is a time point at which paper P starts to be fed from the paper feed portion 4a.

Here, in a copying job, after the start of reading of the document D till the start of printing based on image data obtained through the reading, it is necessary to generate image data, perform image processing on the generated image data, and perform operations in preparation for the start of printing (generating voltages needed for printing, raising the rotation speeds of rotary members to predetermined speeds, etc.). This produces a time lag between the start of reading and the start of printing. The time lag corresponding to the period between T1 and T2 in FIG. 6 and the period between T6 and T9 in FIG. 7.

As shown in FIG. 6, after the start of document reading till the start of printing, the document transport control portion 10b controls such that the document D is transported at quiet speed. On the other hand, after the start of document reading till the start of printing, the reading control portion 10a controls such that members in the image reading portion 1e operate at the speed in quiet reading mode. In this way, in a situation where the noise given off from the document reading section 1 is dominant, the main control section 6 makes the document reading section 1 read the document in quiet reading mode.

Then, at time point T2, when printing is started (when the paper feed portion 4a starts to feed paper), the document transport control portion 10b starts transporting the document at ordinary speed. On the other hand, when printing is started, the reading control portion 10a makes members in the image reading portion 1a operate at the speed in ordinary printing mode. In this way, in a situation where the noise given off from the printing section 2 is dominant, the main control section 6 makes the document reading section 1 read the document in ordinary reading mode.

The shift to ordinary reading mode does not necessarily have to be simultaneous with the start of printing (the start of paper feeding by the paper feed portion 4a); a document D at middle of being transported (read) at the start of printing may instead be read and discharged in quiet reading mode. A configuration is possible where, only after the printing section 2 starts printing, starting with the first document D that is fed after the discharge of the entire document read previously in quiet reading mode, the document transport control portion 10b performs document transport at ordinary speed and the reading control portion 10a makes members in the image reading portion 1a operate at the speed in ordinary reading mode.

Then, at time point T3 in FIG. 6, the document transport control portion 10b recognizes, based on the output from the document detection sensor 10s, that no document D is present any longer (that the last page of the document stack has been transported). The document transport control portion 10b thus discharges the last page of the document D onto the document discharge tray 13, and the image reading portion 1a completes the reading of the last page of the document D (at time point T4). The engine control portion 20 then performs printing based on the image data of the last page, and thereby completes printing (at time point T5).

In the embodiment under discussion, the time point at which the last page with respect to a given printing job is discharged onto the discharge tray 44 is taken as marking the completion of printing. In other words, with respect to a job, when sheets of paper P having all the pages printed on them have been discharged onto the discharge tray 44, printing is completed. Incidentally, in the multifunction peripheral 100 according to this embodiment, near the discharge roller pair 46, a discharge detection sensor 25 (see FIG. 5) is provided for detecting discharge of printed paper P onto the discharge tray 44. The engine control portion 20 recognizes whether paper P has been discharged on the discharge tray 44 or not based on the output from the discharge detection sensor 25.

In a situation where the document D placed on the document tray 11 contains few sheets (for example, one or two sheets), the reading of the document D may be completed while reading is continued in quiet reading mode. This will now be described below with reference to FIG. 7.

In FIG. 7, time point T6 is a time point at which the START key 35 is operated or otherwise to start to read a document D (to start to feed the first sheet of the document D). Time point T7 is a time point at which the document transport control portion 10b recognizes, based on the output from the document detection sensor 10s, that no document D is present any longer. Time point T8 is a time point at which the image reading portion 1a completes reading the last page of the document D (a time point at which the last page of the document D is discharged onto the document discharge tray 13).

In a situation where, as mentioned above, the document D placed on the document tray 11 contains few sheets, in a reading job, it can occur that, within the period between the start of reading of the document D and the start of printing based on image data obtained through the reading (before time point T9), the reading of the document D is completed. In such a situation, the document reading section 1 performs reading only in quiet reading mode. Thus, even when the document D placed on the document tray 11 contains few sheets, the document reading section 1 does not give off noise so disturbing as to be perceived unpleasant to the user.

(Flow of Shifts Between Reading Modes in the Document Reading Section 1)

Figure 8:
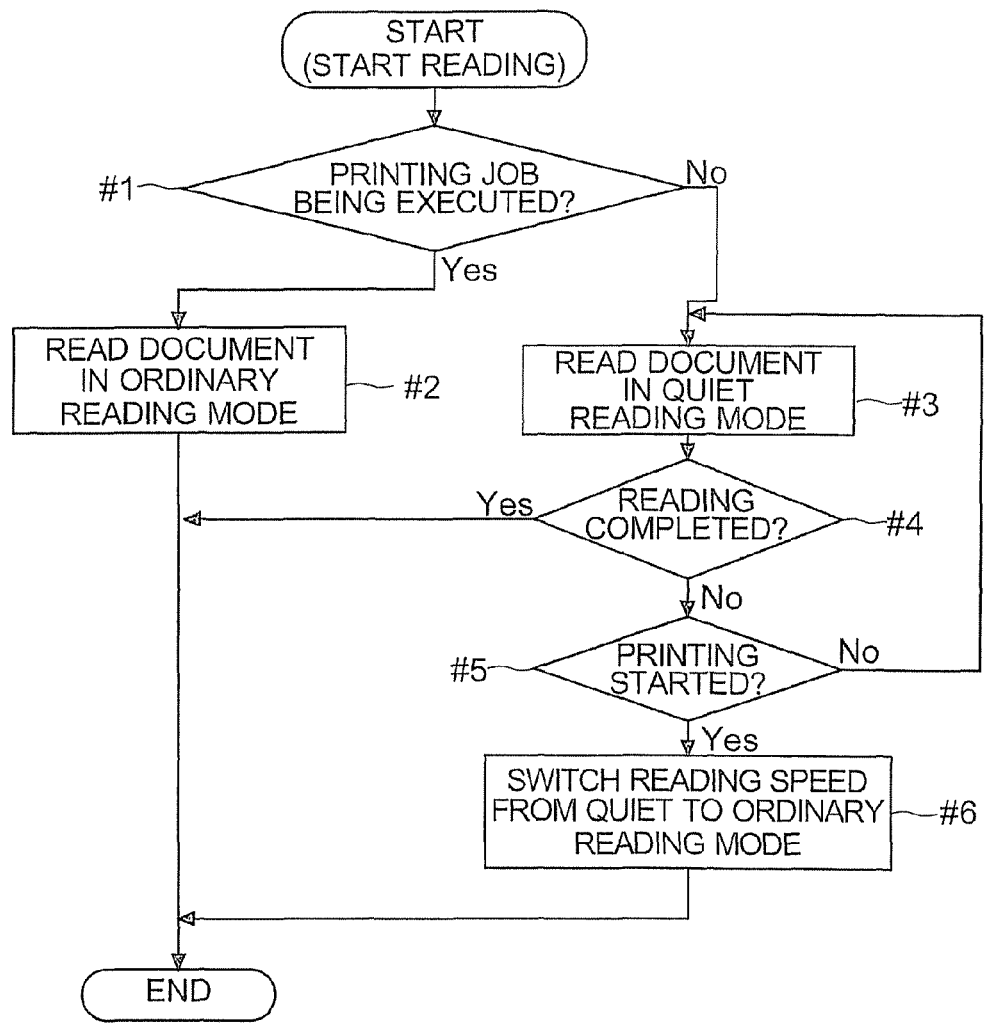
FIG. 8 is a flow chart showing a flow of reading mode shifting in a document reading section according to one embodiment of the present disclosure.

Next, with reference to FIG. 8, a description will be given of a flow of shifts between reading modes in the document reading section 1. FIG. 8 is a flow chart showing a flow of shifts between reading modes in the document reading section 1.

The flow of FIG. 8 starts at a time point that, for a copying job, with a document D placed on the document tray 11, the document D is about to be read.

First, the main control section 6 checks whether or not the printing section 2 is performing a printing job (step #1). For example, it can occur that, at the time point that the first sheet of the document D for the job starts to be transported, a printing, copying, or other job is already being performed such that the printing section 2 is performing printing. While a printing job like that is being executed, even when the document D is read in ordinary reading mode, the noise given off from the document reading section 1 is not perceived disturbing by the user.

If, in a copying job in which the printing section 2 performs printing based on image data obtained by reading a document D transported by the document transport portion 1b, at the time point that the first sheet of the document D starts to be transported, the printing section 2 is performing previously started printing (step #1, "Yes"), then the main control section 6 makes the document reading section 1 read the document D in ordinary reading mode (step #2). In this case, even before the printing section 2 starts to perform printing based on image data obtained through document reading, the document reading section 1 reads the document D while transporting it in ordinary reading mode and hence at ordinary speed. Thus, even if, at the time point that the document D starts to be read, the document D is read at a high speed (at ordinary speed), the user does not feel unpleasant. Also, the document D can then be read in a shorter period. Specifically, the document transport control portion 10b makes the document transport motor 10m rotate such that the document D is transported at ordinary speed, and the reading control portion 10a makes members in the image reading portion 1a operate at the speed in ordinary reading mode. The document D is read in ordinary reading mode up to its last page (END).

By contrast, if no printing job is being executed (step #1, "No"), the main control section 6 makes the document reading section 1 read the document D in quiet reading mode (step #3). Specifically, the document transport control portion 10b makes the document transport motor 10m rotate such that the document D is transported at quiet speed, and the reading control portion 10a makes members in the image reading portion 1a at the speed in quiet reading mode.

Then, based on the output from the document detection sensor 10s, the document transport control portion 10b and the reading control portion 10a check whether or not the reading of the last page of the document D placed on the document tray 11 has been completed (step #4). If the reading has been completed, while reading is continued in quiet reading mode, the flow ends (END).

If, based on the output from the document detection sensor 10s, the reading of the last page of the document D placed on the document tray 11 have not been completed, the main control section 6 checks whether or not the printing section 2 has started printing (step #5).

If printing has not been started (step #5, "No"), the flow returns to step #3. By contrast, if printing has been started (step #5 "Yes"), the main control section 6 makes the document reading section 1 read the document D with the reading speed switched from that in quiet reading mode to that in ordinary reading mode.

As described above, the image forming apparatus (multifunction peripheral 100) according to this embodiment has a printing section 2 and a document reading section 1. The document reading section 1 can operate in an ordinary reading mode in which it reads a document D at a previously determined ordinary speed, and can operate in a quiet reading mode in which it reads a document D at a quiet speed lower than the ordinary speed. In a copying job in which the printing section 2 performs printing based on image data obtained by reading a document D transported by the document transport portion 1b, the document reading section 1 reads the document D, until the printing section 2 starts printing on image data obtained through document reading, in quiet reading mode and, after the printing section 2 starts printing based on image data obtained through document reading, in ordinary reading mode.

If, while no printing operation (printing job) is being performed, the document D is transported at a high speed, the noise resulting from document transport stands out, and is so disturbing as to tend to be perceived unpleasant by the user. The noise given off from the document reading section 1, which is provided in an upper part of the image forming apparatus, is close to the user's ear. Thus, the noise generated as the document D is transported while no printing is being performed tends to be easily caught by the ear. To avoid that, while the document reading section 1 alone is operating, the reading speed (document transport speed) is reduced to reduce the noise given off from the document reading section 1. On the other hand, when the document reading section 1 starts operating along with the printing section 2, the reading speed (document transport speed) is increased (back to the ordinary speed) to increase productivity by increasing the number of sheets read per unit time. At this time, even when the document D is read at a high speed, the noise given off from the document reading section 1 is masked by the noise given off from the printing section 2 to be unlikely to be caught by the ear. In this way, it is possible to mitigate the harshness of the noise as perceived by humans. Thus, throughout the period that a copying job is executed, the user is saved from noise so disturbing as to be perceived unpleasant. Moreover, the document reading speed is increased (back to the ordinary speed) in the middle of operation, image data is generated in time for printing. Moreover, the image forming apparatus (multifunction peripheral 100) as a whole exhibits higher productivity (processing performance) than during execution of a copying job in quiet reading mode alone.

(Stopping the Rotation of the Polygon Motor 24)

Figure 9:
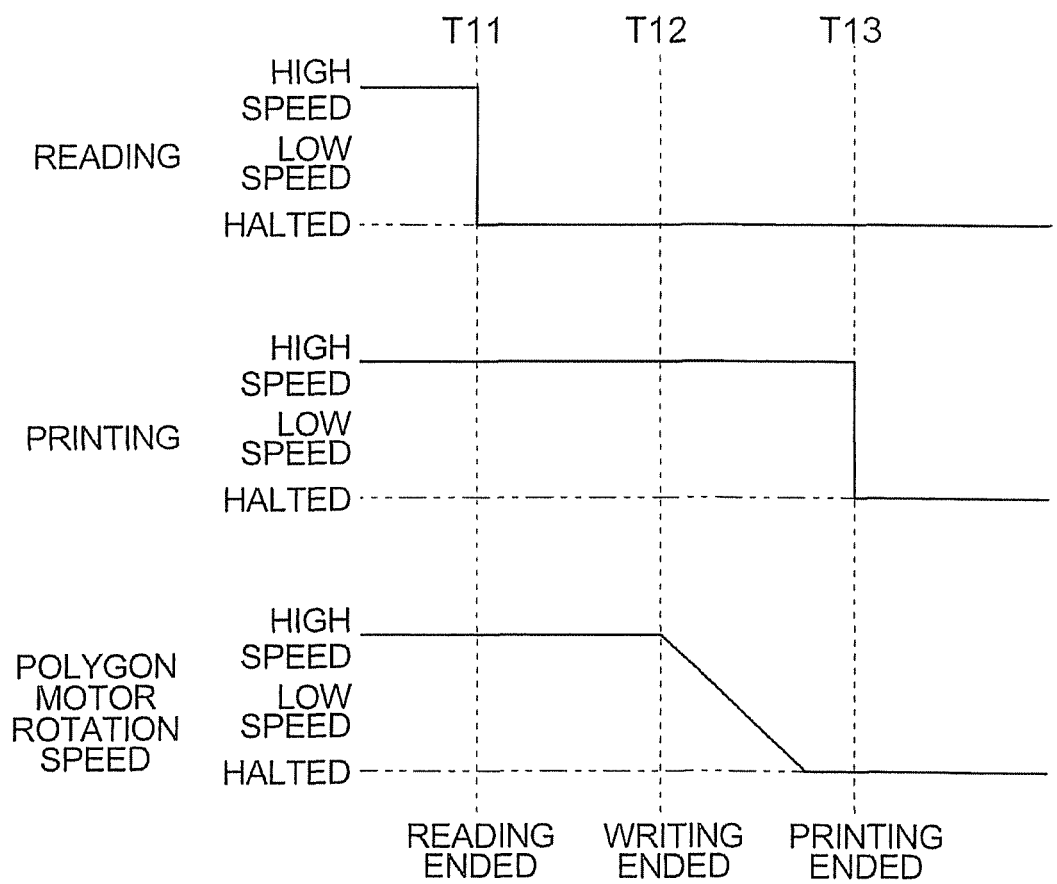
FIG. 9 is a timing chart illustrating stopping of rotation of a polygon motor according to one embodiment of the present disclosure.

Next, with reference to FIGS. 5 and 9, a description will be given of how the rotation of the polygon motor 24 is stopped in this embodiment. FIG. 9 is a flow chart illustrating how the rotation of the polygon motor 24 is stopped.

The printing section 2 has an image forming portion 5a, which includes a photosensitive drum and a exposing device 51 for performing scanning and exposure based on image data to form an electrostatic latent image on the photosensitive drum and which forms a toner image. The exposing device 51 includes, for scanning and exposure of the photosensitive drum, a semiconductor laser device (not shown) and a polygon motor 24 (see FIG. 5) for rotating a polygon mirror 24a for scanning and exposure of the photosensitive drum. The polygon motor 24 rotates at a speed as high as several tens of thousands of revolutions per minute (rpm), and can give off high-frequency noise that the user may perceive unpleasant.

Conventionally, until the paper P of the last page of a printing job is discharged onto the discharge tray 44, the engine control portion 20 continues feeding a driving signal for rotating the polygon motor 24 (that is, the polygon motor 24 continues rotating). Thus, after the start of printing until the completion of discharging of the paper P of the last page of a printing job, and during the period that, after the completion of discharging to the discharge tray 44, the polygon motor 24 continues rotating by inertia, noise is given off which may be perceived unpleasant by the user.

To avoid that, in the multifunction peripheral 100 according to this embodiment, on completion of scanning and exposure (writing to the photosensitive drum) with respect to the last page of a printing job, the engine control portion 20 stops the rotation of the polygon motor 24. In other words, just before the paper of the last page is discharged onto the the discharge tray 44, the engine control portion 20 stops feeding the driving signal to the polygon motor 24.

This will now be described with reference to FIG. 9. In FIG. 9, time point T11 is a time point at which the reading of a document D (document transport and image data generation) in the document reading section 1 is completed. In a copying job, before the start of printing of the last page, the reading of the last page of the document D placed on the document tray 11 ends. The document transport control portion 10b can recognize, based on the output from the document detection sensor 10s, whether or not a sheet of the document D fed is the last one.

In the printing of the last page, before transport of paper up to its discharge onto the discharge tray 44, fusion, primary transfer, and secondary transfer, scanning and exposure of the photosensitive drum needed to form the toner image of the last page end. In FIG. 9, time point T12 is a time point at which scanning and exposure of the photosensitive drum needed to form the toner image of the last page end.

The time point to be taken as the end of scanning and exposure of the photosensitive drum for the last page can be determined arbitrarily. For example, the time point that the position of scanning and exposure with respect to the photosensitive drum has passed the position corresponding to the last line in the sub scanning direction can be taken as the end of scanning and exposure. Instead, the engine control portion 20 can, based on the image data of the last page of a printing job, recognize, within the last page, the position of the dots where toner is deposited closest to the sheet rear edge in the sub scanning direction, and take as the end time point the time point at which all the dots in the last page where exposure is needed have been scanned and exposed (the time point at which the dots where toner is deposited closest to the sheet rear edge in the sub scanning direction have been exposed).

In FIG. 9, time point T13 is a time point at which the discharge of paper P onto the discharge tray 44 is completed (a time point of completion of printing). In the example shown in FIG. 9, before the last page is discharged onto the discharge tray 44, the polygon motor 24 is stopped. While the polygon motor 24 can be a source of noise so disturbing as to be perceived unpleasant by the user, the engine control portion 20, on completion of scanning and exposure necessary to print the last page to be printed, starts to stop the polygon motor 24. At the end time point of scanning and exposure of the photosensitive drum for the last page, the engine control portion 20 starts to stop the rotation of the polygon motor 24 earlier than conventionally practiced to promptly reduce the noise given off from the polygon motor 24. This permits the multifunction peripheral 100 to operate with enhanced quietness. Also, the user can be saved from noise so disturbing as to be perceived unpleasant.

(Intentional Lag in Sheet/Paper Feed Timing)

Figure 10:
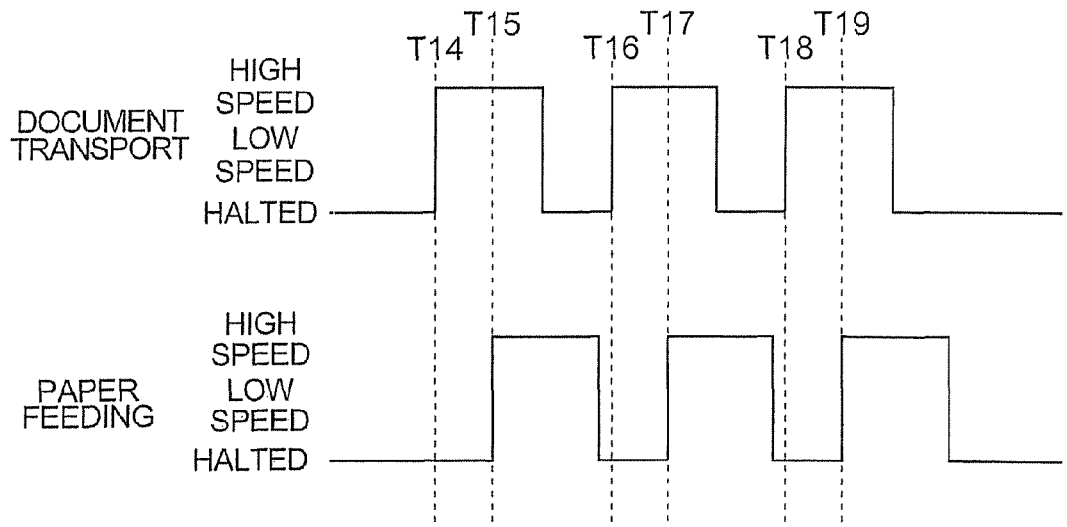
FIG. 10 is a diagram showing a time lag between the start of document thrusting in a document reading section and the start of paper feeding from a paper feeding portion according to one embodiment of the present disclosure.

Next, with reference to FIG. 10, a description will be given of a time lag between the start of feeding of a document D in the document reading section 1 and the start of feeding of paper P from the paper feed portion 4*a*. FIG. 10 is a diagram showing time lags between the start of feeding of a document D in the document reading section 1 and the start of feeding of paper P from the paper feed portion 4*a*.

During transport of a document D from the document tray 11, due to rollers starting to rotate, and due to sheets of the document rubbing against each other, loud noise tends to be generated when the document D placed starts to be thrust (fed). Likewise, during printing, due to rollers starting to rotate, and due to sheets of paper rubbing against each other, loud noise tends to be produced when paper P inside a cassette (inside the paper feed portion 4*a*) starts to be thrust (fed).

Here, when, as in a copying job, printing is performed while reading the document D, a time point at which the document D starts to be transported (the document feed time point) and a time point at which the paper P starts to be fed can be coincident or very close to each other. If the time point of the start of transport of the document D and the time point of the start of feeding of the paper P are close together, loud noise from the two sources can be generated in overlapping time zones, resulting in quite loud noise overall.

To reduce the noise, the main control section 6 starts, at different time points apart from one another by a predetermined time interval or more, the feeding of paper from the paper feed portion 4*a* and the feeding of the document D from the document transport portion 1*b*. Specifically, the printing section 2 includes a paper feed portion 4*a* which supplies paper P, and the paper feed portion 4*a* and the document transport portion 1*b* start the thrusting of paper P and of a document D at different time points. It is thus possible to prevent the image forming apparatus (multifunction peripheral 100) from making large noise resulting from the thrusting of the document D and of the paper P taking place in overlapping periods.

This will now be described with reference to FIG. 10. In FIG. 10, in the plot at top, a high state is a state where the document D is being fed and transported. In other words, it is a state where the document transport control portion 10*b* makes the document transport motor 10*m* rotate. A low state is a state where the document D is not being fed or transported. In other words, it is a state where the document transport control portion 10*b* does not make the document transport motor 10*m* rotate.

On the other hand, in FIG. 10, in the plot at bottom, a high state is a state where the paper feed portion 4*a* is feeding paper. In other words, it is a state where the engine control portion 20 makes the paper feed roller 41 rotate. A low state is a state where the paper feed portion 4*a* is not feeding paper. In other words, it is a state where the engine control portion 20 does not make the paper feed roller 41 rotate.

In the multifunction peripheral 100 according to this embodiment, as time points T14 to T19 indicate, the engine control portion 20 and the document transport control portion 10*b* make different the time point of the start of transport of the document D and the time point of the start of feeding of the paper (the start of rotation of the paper feed roller 41). The difference is equal to or longer than a predetermined time interval. This permits the multifunction peripheral 100 to operate with enhanced quietness.

(Adjusting the Operating Sound Level)

Figure 11:
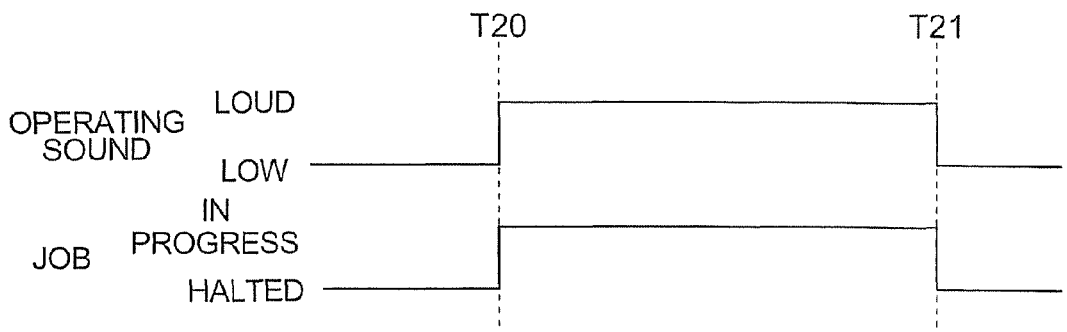
FIG. 11 is a diagram illustrating adjustment of operating sound in accordance with whether printing is being performed or not in an image forming apparatus according to one embodiment of the present disclosure.

Next, with reference to FIGS. 5 and 11, a description will be given of how the level of the operating sound that accompanies operation on the operation panel 3 is adjusted according to whether or not printing is being performed. FIG. 11 is a diagram illustrating how the operating sound level is adjusted according to whether or not printing is being performed.

First, the multifunction peripheral 100 is provided with an operation section (operation panel 3) including a sound generator 38 which accepts setting operations by the user through touch operations and which generates operating sound when touch operations are made (see FIG. 4). The sound generator 38 is, for example, a loudspeaker that generates electronic sound. The operating sound permits the user to confirm acceptance of his touch operations.

When no document transport or printing is being performed, the image forming apparatus makes little noise. Thus, while no job is being executed, the operating sound is easily caught by the ear. Thus, if the operating sound is too high or too loud, it may be perceived disturbing by the user. On the other hand, when the document reading section 1 or the printing section 2 is executing a job, the operating sound from the sound generator 38 is masked and is less easily caught by the ear.

Accordingly, in the multifunction peripheral 100 according to this embodiment, when the document reading section 1 and the printing section 2 are not performing a job, the sound generator 38 reduces the level of the operating sound than when they are performing a job. On the other hand, when one or both of the document reading section 1 and the printing section 2 are executing a job, the sound generator 38 increases the operating sound than when neither is executing a job. In other words, while the document reading section 1 or the printing section 2 is executing a job, the sound generator 38 increases the operating sound than when neither is executing a job. By contrast, when no job is being performed, the level of the operating sound is reduced to prevent the user from feeling unpleasant. On the other hand, when a job is being executed, the operating sound is sounded loudly enough to be easily heard but not to be so disturbing as to be perceived unpleasant by the user.

With respect to FIG. 11, more details will be given. In FIG. 11, the plot at top represents the loudness of the operating sound. The plot at bottom represents presence/absence of a job such as document reading (document transport) and printing (paper feeding and discharge). A high state is a state in which a job is being performed, and a low state is a state in which no job is being performed.

As shown in FIG. 11, when a job such as document reading or printing is executed, the panel control portion 30 sets the level of the operating sound high (at time point T20). Thus, while the job is being executed, whenever an operation is made, the panel control portion 30 makes the sound generator 38 generate louder operating sound than when no job is being executed. When the job is completed (as on completion of discharge of the last page onto the discharge tray 44, or on completion of reading of the last page of the document D, the panel control portion 30 reduces the operation sound level (at time point T21). This permits the multifunction peripheral 100 to operate with enhanced quietness.

(Controlling the Rotation of a Fan 26 According to Printing Mode)

Figure 12:
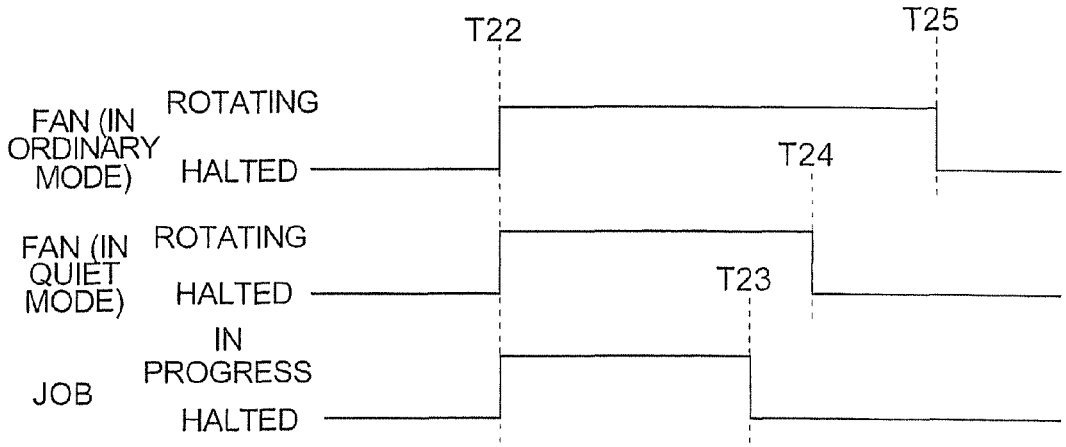
FIG. 12 is a diagram illustrating control of rotation of a fan in accordance with printing mode in an image forming apparatus according to one embodiment of the present disclosure.

Next, with reference to FIGS. 5 and 12, a description will be given of how the rotation of a fan 26 is controlled according to the printing mode. FIG. 12 is a diagram illustrating how the rotation of a fan 26 is controlled according to the printing mode.

First, the multifunction peripheral 100 according to this embodiment is provided with a fan 26 for heat rejection, cooling, air circulation inside the device, and other purposes; that is, the image forming apparatus (multifunction peripheral 100) is provided with a fan 26 for suction and discharge of air (see FIG. 5). In other words, the printing section 2 includes a fan 26 which rotates during execution of printing. The fan 26 is provided so as to face a cover at the rear face or a side face of the multifunction peripheral 100, or in a rear part inside the device.

The engine control portion 20 controls (turns on and off) the rotation of the fan 26. Specifically, the engine control portion 20 makes the fan 26 rotate at the start of a printing job (at the start of paper feeding), and stops the rotation of the fan 26 at the end of printing (on discharge of the sheet of the last page) or at the lapse of a previously determined cooling period after the end of printing.

Here, when the fan 26 is rotated, it gives off wind noise, and also driving noise of a motor. Thus, not rotating the fan 26 helps reduce the noise given off from the image forming apparatus. Accordingly, in the multifunction peripheral 100 according to this embodiment, the engine control portion 20 stops the fan 26 at different time points during printing in ordinary printing mode and during printing in quiet printing mode.

Specifically, the printing section 2 performs printing at the speed based on the mode setting, and according to the settings on the operation panel 3, the fan 26 stops at an earlier time point during printing in quiet printing mode than in ordinary printing mode. This will now be described with reference to FIG. 12. First, time point T22 in FIG. 12 is a time point at which a printing job is started (a time point at which paper P starts to be fed). In this embodiment, an example is dealt with where the fan 26 is rotated from the start of a printing job; instead, the fan 26 may be started to rotate at the lapse of a previously determined period after the start of printing.

Time point 23 in FIG. 12 is a time point of completion of the printing job (discharge of the last page in the printing job onto the discharge tray 44). The engine control portion 20 stops the fan 26 earlier during printing in quiet printing mode than during printing in ordinary printing mode. In other words, the engine control portion 20 makes the period after the end of a printing job till the stop of the fan 26 shorter during printing in quiet printing mode than during printing in ordinary printing mode. In FIG. 12, T24 represents a time point at which the engine control portion 20 stops the fan 26 during printing in quiet printing mode, and T25 represents a time point at which the engine control portion 20 stops the fan 26 during printing in ordinary printing mode.

Thus, in quiet printing mode, based on the purpose of the mode, that is, the purpose of reducing as much as possible the noise generated during execution of a job, it is possible to reduce as much as possible the noise given off from the multifunction peripheral 100. On the other hand, during printing in ordinary printing mode, sufficient cooling and air circulation are performed. In quiet printing mode, the execution speed of the printing job is reduced, and thus less heat is generated, and stopping the fan 26 earlier does not pose a problem.

(Switching the Printing Speed Automatically)

Figure 13:
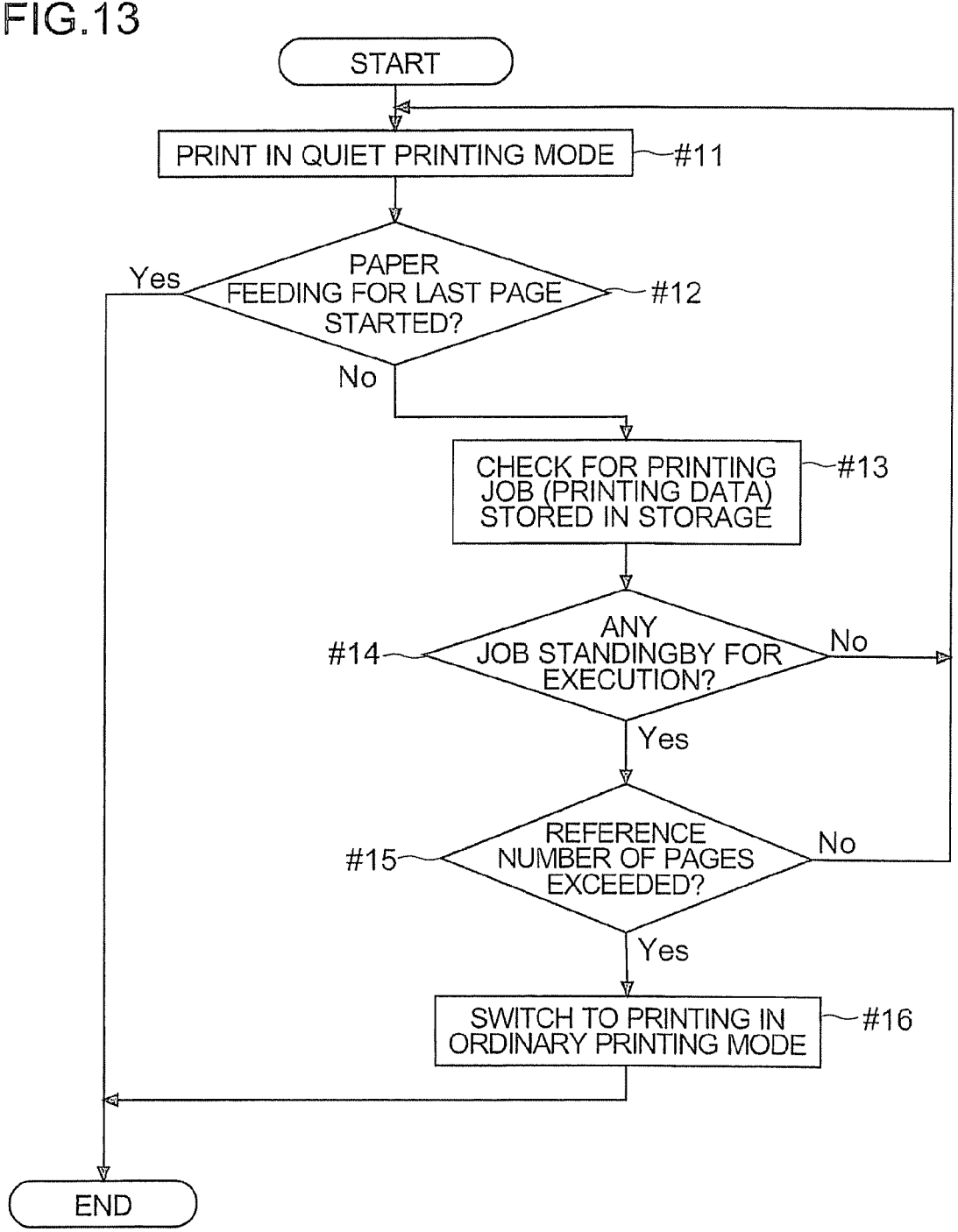
FIG. 13 is a flow chart illustrating a flow of automatic switching of printing speed in an image forming apparatus according to one embodiment of the present disclosure.

Next, with reference to FIG. 13, a description will be given of automatic switching of the printing speed. FIG. 13 is a flow chart illustrating the flow of automatic switching of the printing speed.

As described above, with the multifunction peripheral 100 according to this embodiment, the user can choose the execution speed of printing (whether to print in ordinary printing mode or in quiet printing mode). In other words, the operation section (operation panel 3) accepts a mode setting as to whether to perform printing in ordinary printing mode or in quiet printing mode. The main control section 6 gives the engine control portion 20 an instruction to perform printing at the speed corresponding to the mode accepted on the operation panel 3 through operation of the mode set key 37. According to the instruction, the engine control portion 20 controls the operating speed of the printing section 2.

Printing data of a printing job that is fed to the multifunction peripheral 100 includes printing data of a copying job. In a copying job, image data obtained through reading by the document reading section 1, settings made on the operation panel 3 before execution of the copying job, etc. are stored as printing data in the storage device 61. Printing data of a printing job that is fed to the multifunction peripheral 100 also includes printing data of a printing job transmitted from a computer 200 and received by the communication portion 62 (a job that uses the multifunction peripheral 100 as a printer). In a printing job, data indicating the content of printing received from the computer 200, settings made by use of driver software of the computer 200, etc., are stored as printing data in the storage device 61. Printing data of a printing job that is fed to the multifunction peripheral 100 further includes printing data of a FAX printing job (a job that uses the multifunction peripheral 100 as a FAX receiver) transmitted from a FAX machine 300 and received by the communication portion 62. In a FAX printing job, image data received from the sender-side FAX machine 300, data indicating settings for printing, etc. are stored as printing data in the storage device 61.

As described above, printing data includes image data of each page of a printing job to be executed, setting data related to printing (set values for the function to be used, such as sheet size to be used in printing and whether or not to perform double-sided printing). The engine control portion 20 makes the printing section 2 perform printing by using printing data.

Here, when, during execution of a printing job, printing data of another printing job is fed to the multifunction peripheral 100, the end of the previous printing job needs to be waited for, and thus printing based on the fed printing data cannot be started immediately. Thus, when new printing data is fed to the multifunction peripheral 100 during execution of a printing data, the storage device 61 stores (accumulates) the newly fed printing data. The storage device 61 can store a plurality of sets of printing data (printing jobs) standing by for execution. When a plurality of sets of printing data are accumulated, those sets of printing data (printing jobs) are printed on a first-in first-out basis.

Here, assuming that the same number of sheets are printed, the time that it takes from the start of printing to the end of printing is longer in quiet printing mode than in ordinary printing mode. When a large number of sheets are printed, or when a plurality of printing jobs are standing by, continuing printing in quiet printing mode leads to a long wait for the user.

To avoid that, in the multifunction peripheral 100 according to this embodiment, during printing in quiet printing mode, when so many printing jobs (so much printing data) as to be recognized to prolong the time till the printed copies are obtained have been accumulated in the storage device 61, the printing speed is automatically switched to a high speed. Specifically, during printing in quiet printing mode, when a predetermined number of printing jobs (a predetermined amount of printing data) have been accumulated in the storage device 61, the engine control portion 20 switches the printing speed to that in ordinary printing mode.

Now, with reference to FIG. 13, a description will be given of a flow of automatic switching to the printing speed in ordinary printing mode during printing in quiet printing mode.

The flow of FIG. 13 starts at a time point that the mode set key 37 is so operated as to start printing in quiet printing mode. The engine control portion 20 then makes the printing section 2 perform printing in quiet printing mode (step #11). Specifically, the engine control portion 20 makes the printing section 2 perform paper transfer and toner image formation in quiet printing mode (at quiet speed).

Next, the engine control portion 20 checks whether or not paper feeding for the last page of the printing job has been started (step #12). The engine control portion 20 can check whether or not paper feeding for the last page of the printing job has been started by referring to the number of sheets fed after the start of printing based on printing data.

If printing of the last page has been started (step #12, "Yes"), a printing job standing by for execution is about to be started, and thus the flow ends ("END"). By contrast, if printing of the last page has not yet been started (step #12, "No"), first, the engine control portion 20 communicates with the main control section 6 and the storage device 61, and checks the printing jobs (printing data) stored in the storage device 61 (step #13).

Then, the engine control portion 20 checks whether or not there is any printing job standing by for execution (any printing job accumulated) in the storage device 61. If there is no printing job standing by for execution (step #14, "No"), the flow returns to step #11.

By contrast, if there is any printing job standing by for execution (step #14, "Yes"), the engine control portion 20 checks whether or not the number of remaining pages to be printed is greater than a previously determined reference number of pages (Step #15). Specifically, the engine control portion 20 checks whether or not the sum of the number of sheets still to be fed for the printing job currently being executed, or the number of sheets still to be discharged onto the discharge tray 44, and the number of sheets to be printed for the printing job standing by for execution is greater than the reference number of sheets. The "reference number of sheets" is set at a number in the range of 10 pages to several tens of pages (10 to 30 pages).

If the number of remaining pages to be printed is equal to or smaller than the reference number of pages (step #15, "No"), the flow returns to step #11. By contrast, if the number of remaining pages to be printed is greater than the reference number of pages (step #15, "Yes"), the engine control portion 20 switches the printing speed from that in quiet printing mode to that in ordinary printing mode (step #16). That is, if there is a job standing by for execution, and in addition if the number of remaining pages to be printed exceeds the previously determined number of pages, then, even if such a mode setting is made as to perform printing in quiet printing mode, the printing section 2 switches the printing speed to perform printing in ordinary printing mode. In this way, when jobs to be executed have been accumulated, a large number of sheets have to be printed, and a long time is expected before completion of the printing jobs, the printing speed is increased automatically. Thus, the printing speed is adjusted automatically so as to be convenient to the user (so that the printed copies are obtained quickly). The engine control portion 20 then continues printing at the speed after the automatic switching (in ordinary printing mode) till completion of all the accumulated printing jobs ("END").

Specifically, paper feeding is temporarily suspended, and when all the pages for which paper feeding, paper transport, and toner image formation have been performed in quiet printing mode have been discharged onto the discharge tray 44, or when toner image formation and transfer for all the pages for which paper feeding and toner image formation have been performed in quiet printing mode have been completed, the engine control portion 20 makes the printing section 2 start printing operation, including paper feeding, paper transport, and toner image formation, in ordinary printing mode.

(Automatic Switching of the Reading Speed)

Figure 14:
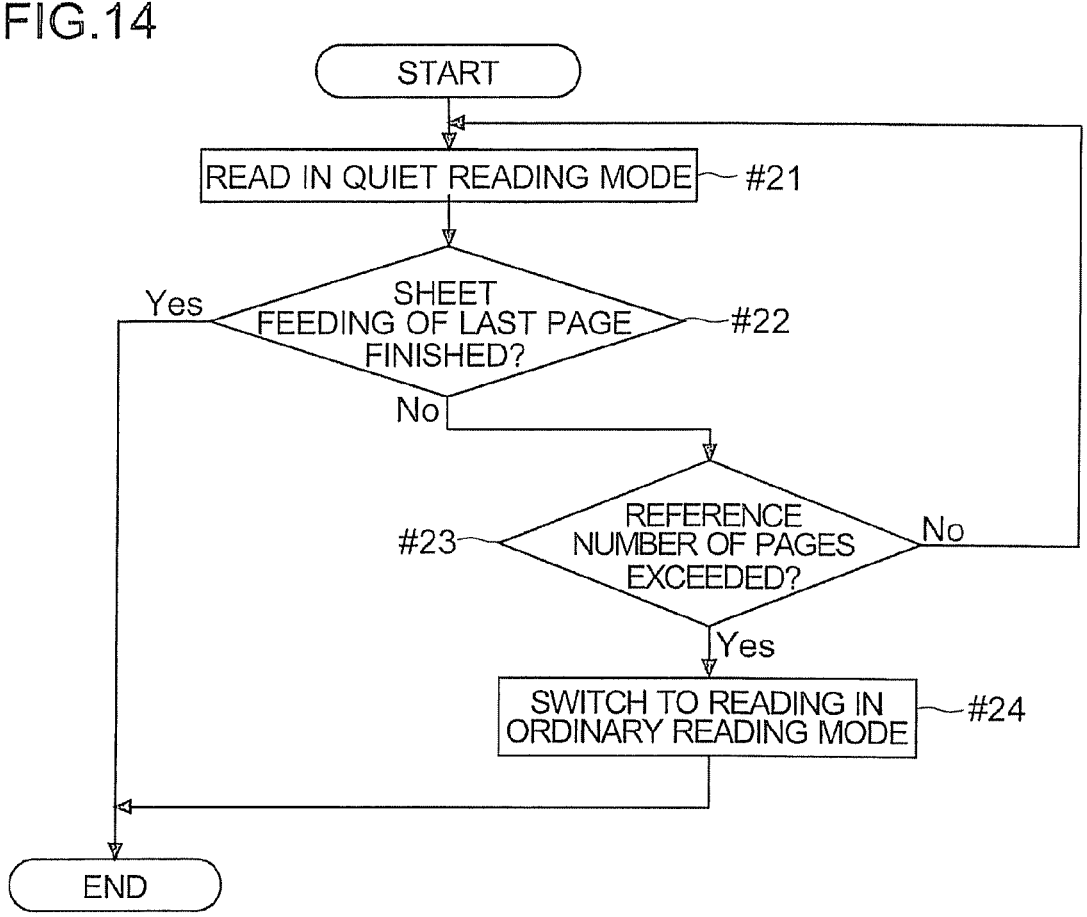
FIG. 14 is a flow chart illustrating a flow of automatic switching of reading speed in an image forming apparatus according to one embodiment of the present disclosure.

Next, with reference to FIG. 14, a description will be given of automatic switching of the reading speed. FIG. 14 is a flow chart illustrating a flow of automatic switching of the reading speed.

In the multifunction peripheral 100 according to this embodiment, in a job like a copying job where document reading and printing are performed concurrently, reading is performed at first in quiet reading mode and then, after the start of printing, in ordinary reading mode.

On the other hand, in the multifunction peripheral 100 according to this embodiment, when a job of document reading that is not accompanied by printing is executed, the user can choose the execution speed of reading (whether to read a document D in ordinary reading mode or in quiet reading mode). Specifically, the operation section (operation panel 3) accepts operation on the mode set key 37 as a mode setting operation for choosing whether to perform reading in ordinary reading mode or in quiet reading mode. The main control section 6 gives the document reading section 1 an instruction to perform reading at the speed corresponding to the mode set on the operation panel 3. According to the instruction, the document transport control portion 10b and the reading control portion 10a controls the operating speed of the document reading section 1.

A document reading job that is not accompanied by printing is, for example, a transmission job for transmission to a computer 200 or a FAX machine 300 based on image data read by the document reading section 1, and a box accumulation job for storing image data read by the document reading section 1 in the storage device 61.

Here, assuming that a document D containing the same number of sheets is read, the time it takes to read the document D is longer in quiet reading mode than in ordinary reading mode. When the document D placed on the document tray 11 contains a large number of sheets, continuing reading in quiet reading mode leads to a long wait for the user till the end of reading.

To avoid that, in the multifunction peripheral 100 according to this embodiment, during reading in quiet reading mode, if a long time is expected till the end of reading, the reading speed is increased automatically. Specifically, during reading in quiet reading mode, when the number of sheets of the document D fed continuously after the time point of the start of feeding of the document D till completion of the reading job (until the whole document D is fed out of the document tray 11 and is discharged onto the document discharge tray 13) has exceeded a reference number of sheets read, the document reading section 1 automatically switches from quiet reading mode to ordinary reading mode to continue to read the document D.

Specifically, the document transport control portion 10b initially transports the document D at quiet speed, and when the mode is automatically switched, controls the rotation speed of the document transport motor 10m such that the document D is transported at ordinary speed. On the other hand, the reading control portion 10a initially controls such that image data generation and image processing with respect to the document D are performed at quiet speed, and when the mode is automatically switched, controls such that image data generation and image processing with respect to the document D are performed at ordinary speed.

Now, with reference to FIG. 14, a description will be given of automatic switching of the reading speed to that in ordinary reading mode during reading in quiet reading mode.

The flow of FIG. 14 starts at a time point that a job for reading a document D that is not accompanied by printing is about to be started in quiet reading mode. The main control section 6 gives the document transport control portion 10b and the reading control portion 10a instructions to make the document reading section 1 perform reading in quiet reading mode (step #21). Specifically, the engine control portion 20 performs transport of the document D and makes members in the image reading portion 1a operate in quiet reading mode (at quiet speed).

Next, the document transport control portion 10b checks, based on the output from the document detection sensor 10s, whether or not feeding of the last page of the document D placed on the document tray 11 has started (step #22).

If reading (paper feeding) of the last page has been started (step #22, "Yes"), no sheet of the document D remains to be fed, and thus the flow ends ("END"). By contrast, if reading (paper feeding) of the last page has not been started (step #22, "No"), the printing section 20 checks whether or not the number of sheets that have been fed out of the document D after the start of the current reading job has exceeded the reference number of sheets read (step #23). The "reference number of sheets read" is a value that can be determined arbitrarily. For example, the "reference number of sheets read" is set at a value in the range of about ten to several tens of pages (10 to 30 pages). Data indicating the "reference number of sheets read" is stored in the storage device 61 or in a memory within the document reading section 1.

If the number of sheets that have been fed out of the document D after the start of the current reading job is equal to or smaller than the reference number of sheets read (step #23, "No"), the flow returns to step #21. On the other hand, during reading of a document D at a speed based on a mode setting, specifically during reading of the document D in a quiet reading mode unaccompanied by printing, if the number of sheets that have been fed continuously out of the document D after the start of the current reading job has exceeded the reference number of sheets read (step #23, "Yes"), the document reading section 1 switches the reading speed from that in quiet reading mode to that in ordinary reading mode, and performs reading of the document D in ordinary reading mode (Step #24). Thus, when the document D to be read contains a large number of sheets, and completing document reading is expected to require a long time, the reading speed of the document D is automatically increased. Thus, the reading speed of the document D is adjusted automatically so as to be convenient to the user (such that reading of the document D is finished quickly). The document reading section 1 then continues reading at the speed after the automatic switching (in ordinary reading mode) till completion of the reading job.

Specifically, feeding of the document D is temporarily suspended, and when the last page fed in quiet reading mode is discharged onto the document discharge tray 13, the document reading section 1 performs (restarts) reading operation, including paper feeding, document feeding, scanning, and reading, in ordinary reading mode.

An embodiment of the present disclosure has been described above. The scope of the present disclosure, however, is not limited by the embodiment. The present disclosure may be implemented with any modifications made without departing from its spirit.

What is claimed is:

1. An image forming apparatus comprising:
   a printing section which prints on paper while transporting the paper; and
   a document reading section, including a document transport portion which automatically transports, sheet by sheet, a document placed thereon,
   the document reading section being operable
      in an ordinary reading mode in which the document reading section reads the document at a previously determined ordinary speed and
      in a quiet reading mode in which the document reading section reads the document at a quiet speed lower than the ordinary speed,
   in a copying job in which the printing section prints based on image data obtained by reading the document transported by the document transport portion, the document reading section
      generating the image data by reading the document in the quiet reading mode until the printing section starts to print based on the image data obtained by document reading and
      generating the image data by reading the document in the ordinary reading mode after the printing section starts to print based on the image data obtained by document reading.

2. The image forming apparatus according to claim 1, wherein
   in the copying job in which the printing section prints based on the image data obtained by reading the document transported by the document transport portion, at a time point that the document reading section starts transporting the document, when the printing section is performing previous printing, the document reading section reads the document while transporting the document at the ordinary speed in the ordinary reading mode even before the printing section starts to print based on the image data obtained by document reading.

3. The image forming apparatus according to claim 1, wherein
the printing section includes an image forming portion for forming a toner image, the image forming portion including a photosensitive drum and an exposing device for performing scanning and exposure based on the image data to form an electrostatic latent image on the photosensitive drum,
the exposing device includes a polygon motor for rotating a polygon mirror for scanning and exposure of the photosensitive drum, and
the polygon motor starts to stop on completion of scanning and exposure needed to print a last page to be printed.

4. The image forming apparatus according to claim 1, further comprising an operation section which accepts a setting operation through a touch operation by a user and which includes a sound generating portion, the sound generating portion generating operating sound when the touch operation is made,
wherein the sound generating portion makes the operating sound louder when either or both of the document reading section and the printing section are executing a job than when neither of the document reading section and the printing section is executing a job.

5. The image forming apparatus according to claim 1, further comprising an operation section which accepts a setting operation through a touch operation by a user,
wherein
the printing section includes a fan rotated during printing, the printing section being operable
in an ordinary printing mode in which the printing section prints at a previously determined ordinary speed and
in a quiet printing mode in which the printing section prints at a quiet speed lower than the ordinary speed,
the operation section accepts a mode setting as to whether to print in the ordinary reading mode or in the quiet printing mode,
the printing section prints at a speed based on the mode setting, and
the fan stops at an earlier time point during printing in the quiet printing mode than during printing in the ordinary printing mode.

6. The image forming apparatus according to claim 1, further comprising an operation section which accepts a setting operation through a touch operation by a user,
wherein
the operation section accepts a mode setting as to whether to print
in an ordinary printing mode for printing at a previously determined ordinary speed or
in a quiet printing mode for printing at a quiet speed lower than the ordinary speed, and
when a job is standing by for execution and in addition the number of reaming pages to be printed exceeds a previously determined reference number of pages, the printing section so switches printing speeds as to print in the ordinary printing mode even when the mode setting is for the quiet printing mode.

7. The image forming apparatus according to claim 1, further comprising an operation section which accepts a setting operation through a touch operation by a user,
wherein
when the document is read without printing being performed, the operation section accepts a mode setting as to whether to read the document in the ordinary reading mode or in the quiet reading mode,
the document reading section read the document at a speed based on the mode setting, and
while the document is being read in the quiet reading mode without printing being performed, when the number of sheets of the document that have been fed continuously after the document started to be read exceeds a previously determined reference number of sheets, the document reading section so switches reading speeds as to read the document in the ordinary reading mode.

8. The image forming apparatus according to claim 1, wherein
the printing section includes a paper feed portion which feeds the paper, and
the paper feed portion and the document transport portion start to thrust the paper and the document, respectively, at different time points.

9. The image forming apparatus according to claim 1, wherein
during the copying job, after the document starts to be read, when the document is read completely before printing based on the image data obtained by document reading is started, the document reading section reads the document only in the quiet reading mode.

10. A method of controlling an image forming apparatus, comprising the steps of:
reading a document while transporting the document sheet by sheet;
reading the document at a previously determined ordinary speed in an ordinary reading mode and at a quiet speed lower than the ordinary speed in a quiet reading mode; and
in a copying job in which paper is transported and printed based on image data obtained by reading the document transported, generating image data by reading the document
in the quiet reading mode until printing based on the image data obtained by document reading is started and
in the ordinary reading mode after printing based on the image data obtained by document reading is started.

11. The method according to claim 10, further comprising:
in the copying job in which printing is performed based on the image data obtained by reading the document, at a time point that the document starts to be transported, when previous printing is being performed, transporting and reading the document at the ordinary speed in the ordinary reading mode even before printing based on the image data obtained by document reading is started.

12. The method according to claim 10, further comprising:
on completion of scanning and exposure needed to print a last page to be printed, making a polygon motor, for rotating a polygon mirror for scanning and exposure of a photosensitive drum, start to stop.

13. The method according to claim 10, further comprising:
accepting a setting operation through a touch operation by a user;
generating operating sound when the touch operation is made; and making the operating sound louder when either or both of document reading and printing are being performed than when neither of document reading and printing is being performed.

14. The method according to claim 10, further comprising:
making a fan rotate during printing;
printing at a previously determined ordinary speed in an ordinary printing mode;
printing at a quiet speed lower than the ordinary speed in a quiet printing mode;
accepting a mode setting as to whether to print in the ordinary reading mode or in the quiet printing mode;
printing at a speed based on the mode setting; and
stopping the fan at an earlier time point during printing in the quiet printing mode than during printing in the ordinary printing mode.

15. The method according to claim 10, further comprising:
printing at a previously determined ordinary speed in an ordinary printing mode;
printing at a quiet speed lower than the ordinary speed in a quiet printing mode;
accepting a mode setting as to whether to print in the ordinary reading mode or in the quiet printing mode; and
when a job is standing by for execution and in addition the number of reaming pages to be printed exceeds a previously determined reference number of pages, switching printing speeds such that printing is performed in the ordinary printing mode even when the mode setting is for the quiet printing mode.

16. The method according to claim 10, further comprising:
when the document is read without printing being performed, accepting a mode setting as to whether to read the document in the ordinary reading mode or in the quiet reading mode;
reading the document at a speed based on the mode setting; and
while the document is being read in the quiet reading mode without printing being performed, when the number of sheets of the document that have been fed continuously after the document started to be read exceeds a previously determined reference number of sheets, switching reading speeds such that the document is read in the ordinary reading mode.

17. The method according to claim 10, further comprising:
starting to transfer paper for printing and to transfer the document for transport at different time points.

18. The method according to claim 10, further comprising:
during the copying job in which printing is performed based on the image data obtained by reading the document, after the document starts to be read, when the document is read completely before printing based on the image data obtained by document reading is started, reading the document only in the quiet reading mode.

* * * * *